United States Patent
Casey et al.

[11] 3,900,834
[45] Aug. 19, 1975

[54] MEMORY UPDATE APPARATUS UTILIZING CHAIN ADDRESSING

[75] Inventors: Richard C. Casey, Darien; Robert J. Duggan, Monroe; Stephen A. Grosky, Monroe; Dixson Teh-Chao Jen, Monroe; John J. Serra, Monroe; Donald Shaffer Whitehead, New Haven; Thomas E. Boyce, Milford, all of Conn.

[73] Assignee: The Bunker-Ramo Corporation, Oak Brook, Ill.

[22] Filed: Sept. 5, 1972

[21] Appl. No.: 286,575

[52] U.S. Cl. .................................. 340/172.5
[51] Int. Cl. ...... G06f 7/28; G06f 15/40; G06f 13/00
[58] Field of Search .............................. 340/172.5

[56] References Cited
UNITED STATES PATENTS

| | | | |
|---|---|---|---|
| 3,546,677 | 12/1970 | Barton | 340/172.5 |
| 3,568,155 | 3/1971 | Abraham | 340/172.5 |
| 3,614,746 | 10/1971 | Klinkhamer | 340/172.5 |
| 3,643,226 | 2/1972 | Loizides | 340/172.5 |
| 3,647,979 | 3/1972 | Rubin | 340/172.5 |
| 3,670,310 | 6/1972 | Bharwani | 340/172.5 |

*Primary Examiner*—Gareth D. Shaw
*Assistant Examiner*—James D. Thomas
*Attorney, Agent, or Firm*—R. J. Kransdorf; F. M. Arbuckle

[57] ABSTRACT

This invention relates to a system in which a control computer supplies rapidly changing information concerning a large plurality of data items to a plurality of programmable control units for updating information contained in the memory of each unit. Each programmable control unit memory may contain information relating to a plurality of different items and information relating to a given item may be stored in a number of different locations within the memory, there being no predetermined relationship between these locations. The control computer sends a like update message to the programmable control units for updating of information relating to a particular item at all locations in each programmable control unit memory at which it appears. This is effected by use of a common address table provided in each memory, which table has an entry for each of the item storing locations in the memory. Each entry in the table contains the address of the corresponding item-storing memory location and a chain address to another entry in the table for a location at which information relating to the same item is stored. An update message relating to a given item contains information permitting a first entry in the table for the given item to be accessed. The address in the accessed entry is utilized to route the information in the message to a location in memory which is to be updated while the chain address in the accessed entry is utilized to access the table entry for another memory location containing information relating to the item. Succeeding table entries in the chain are utilized to control memory updates until all memory locations containing information relating to the item have been updated. Where the update message contains more than one field of information, the above-described procedure may be repeated for each received field. The table may also contain an indication of the type of information stored for the item at each memory location and this information-type indication may be utilized to determine whether information in a given input field is to be utilized for updating information at a given location for the item, and, in some instances, to control the updating.

The system also provides a capability for changing the items concerning which information is stored at a given location. When this occurs, appropriate changes are made in the table entries for the memory location and the chains for the items involved are modified.

32 Claims, 21 Drawing Figures

Fig. 2.

| # | CHARACTER | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 | | A | B | C | . | . | . | + | 9 | 9 | 9 | | 7/8 | | | D | E | F | . | . | . | + | 9 | 9 | 9 | | 7/8 | | | G | H | I | . | . | . | + | 9 | 9 | 9 | | 7/8 | | | |
| 2 | | I | B | M | | | | − | 3 | 5 | 0 | | 3/8 | | | X | R | X | | | | − | 2 | 7 | 3 | | 1/8 | | | M | O | T | | | | | | − | 9 | 4 | | 1/8 | | | |
| 3 | | C | D | A | | | | + | | 3 | 9 | | 1/4 | | | X | R | X | A | | | + | 1 | 0 | 5 | | 1/4 | | | M | O | T | + | | | − | 1 | 0 | 5 | | 1/4 | | | |
| 4 | | T | | | | | | + | | 5 | 7 | | 7/8 | | | A | M | K | | | | − | | 3 | 7 | | 3/4 | | | C | B | P | | | | + | | 4 | 7 | | 7/8 | | | |
| 5 | | T | + | A | | | | − | | 8 | 5 | | 5/8 | | | A | M | K | W | | | − | | 4 | 5 | | 1/4 | | | C | R | I | | | | + | | 3 | 2 | | 1/2 | | | |
| 6 | | T | · | W | S | | | − | | 4 | 3 | | 5/8 | | | E | A | L | | | | − | | 5 | 7 | | 7/8 | | | B | G | H | | | | + | | 6 | 3 | | 3/4 | | | |
| 7 | | | | | | | | | | | | | | | | | | | | | | | | | | | | | | | | | | | | | | | | | | | | | |
| 8 | | | | | | | | | | | | | | | | | | | | | | | | | | | | | | | | | | | | | | | | | | | | | |
| 9 | | | | | | | | | | | | | | | | | | | | | | | | | | | | | | | | | | | | | | | | | | | | | |
| 10 | | I | B | M | | | | + | 3 | 3 | 0 | | 1/2 | | | M | C | A | | | | − | 1 | 0 | 7 | | 3/4 | | | C | D | A | | | | + | 1 | 1 | 4 | | 3/8 | | | |
| 11 | | | | | | 1 | 3 | 2 | | 1 | 0 | | 2/4 | | | | | | | 5 | | 1 | 0 | | 1/8 | | | | | | | | 1 | 7 | | 1 | 0 | | 2/4 | | | | | |
| 12 | | A | D | F | G | | B | 1 | 4 | 7 | | 3/4 | | | G | R | T | V | | B | | 1 | 6 | | 1/8 | | | | | M | D | C | | | | − | | 3 | 0 | | 1/8 | | | |
| 13 | | | | | | | A | 1 | 4 | 8 | | 1/8 | | | | | | | | R | | 1 | 6 | | 1/4 | | | | | | | | 2 | 2 | | 1 | 0 | | 1/8 | | | | | |
| 14 | | B | B | C | | | | − | | | 6 | | 7/8 | | | T | | | | | | + | | 5 | 0 | | 1/8 | | | F | A | L | | | | + | | | 8 | | 1/8 | | | |
| 15 | | | | | | | | | | | | | | | | | | | | 1 | 2 | 0 | | 1 | 0 | | | | | | | | | | | 5 | | 1 | 0 | | 1/8 | | | |
| 16 | | | | | | | 2 | 4 | | 1 | 0 | | | | | | | | | | | | | | | | | | | | | | | | | | | | | | | | | | |
| 17 | | | | | | | | | | | | | | | | | | | | | | | | | | | | | | | | | | | | | | | | | | | | | |
| 18 | | | | | | | | | | | | | | | | | | | | | | | | | | | | | | | | | | | | | | | | | | | | | |
| 19 | | B | R | | | | | − | 1 | 1 | 4 | | 3/4 | | | | | | | | | + | 1 | 1 | 3 | | 7/8 | | | | | | + | 1 | 1 | 3 | | 3/4 | | | | + | 1 | 1 | 3 | 1/2 | − | 1 | 1 | 3 |
| 20 | | I | B | M | | | | | 3 | 3 | 0 | | 1/2 | | | | | | | | | | 3 | 2 | 9 | | 3/4 | | | | | | | 3 | 2 | 8 | | 1/2 | | | | | 3 | 2 | 8 | 1/4 | | 3 | 2 | 8 | 1/2 |
| 21 | | Q | A | B | C | | | | | 1 | 9 | | 1/2 | | | | | | | | | | | 1 | 9 | | 1/4 | | | | | | | | 2 | 2 | | 1/2 | | | | | | | | | | | | |
| 22 | | Q | D | E | F | | | − | | 2 | 2 | | 3/4 | | | | | | | | | | | 2 | 2 | | 1/4 | | | | | | | | | | | | | | | | | | | | | | | |
| 23 | | Q | G | H | I | | | − | | 3 | 3 | | 1/8 | | | | | | | | | + | | 3 | 3 | | 3/8 | | | | | | | | | | | | | | | | | | | | | | | |
| 24 | | Q | J | K | L | | | + | | 2 | 5 | | 7/8 | | | | | | | | | − | | 2 | 5 | | 3/4 | | | | | | − | | 2 | 5 | | 5/8 | | | | + | | 2 | 5 | 1/2 | − | | 2 | 5 | 1/4 |

Fig. 3E.

| WORD | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | CAT LINK | | | | | | | | | CELL ADDR. | | | | | | |
| 2 | CAT LINK | | | | | | | | | CELL ADDR. | | | | | | |
| 3 | CAT LINK | | | | | | | | | CELL ADDR. | | | | | | |
| 4 | CAT LINK | | | | | | | | | CELL ADDR. | | | | | | |
| 5 | CAT LINK | | | | | | | | | CELL ADDR. | | | | | | |
| 8 | CAT LINK | | | | | | | | | CELL ADDR. | | | | | | |
| 9 | CAT LINK | | | | | | | | | CELL ADDR. | | | | | | |
| 10 | A1 ADDRESS | | | | | | | | | TYPE | | | | | | |
| 11 | CAT LINK | | | | | | | | | CELL ADDR. | | | | | | |
| 12 | CAT LINK | | | | | | | | | CELL ADDR. | | | | | | |
| 13 | CAT LINK | | | | | | | | | CELL ADDR. | | | | | | |
| 14 | CAT LINK | | | | | | | | | CELL ADDR. | | | | | | |
| 18 | CAT LINK | | | | | | | | | CELL ADDR. | | | | | | |
| 19 | CAT LINK | | | | | | | | | CELL ADDR. | | | | | | |
| 20 | A1 ADDRESS | | | | | | | | | TYPE | | | | | | |

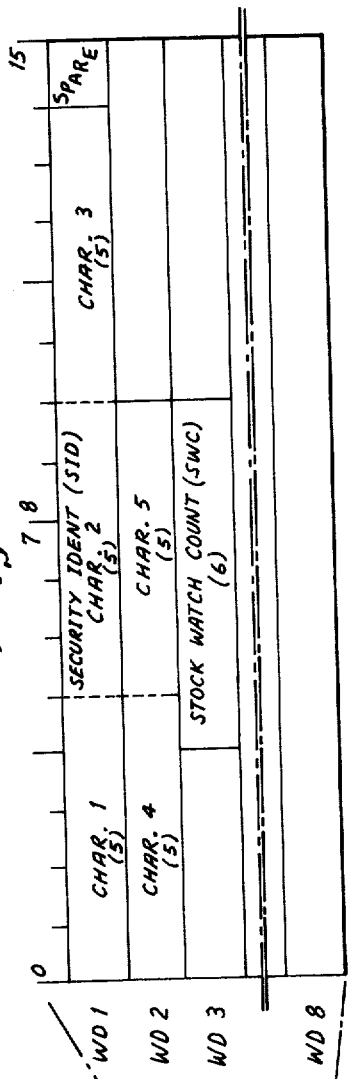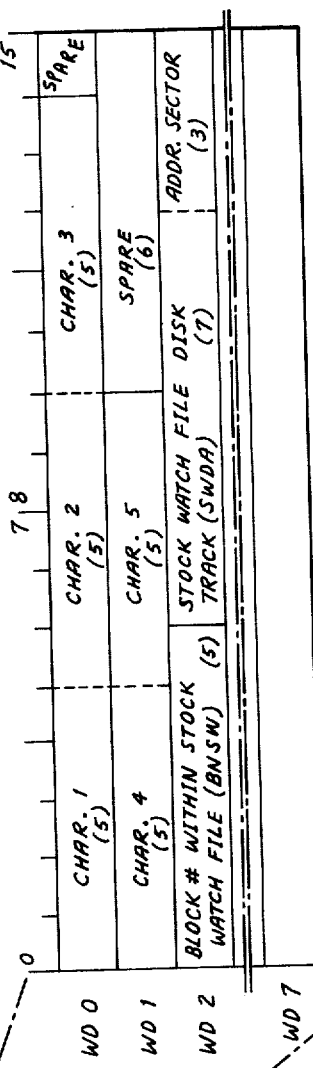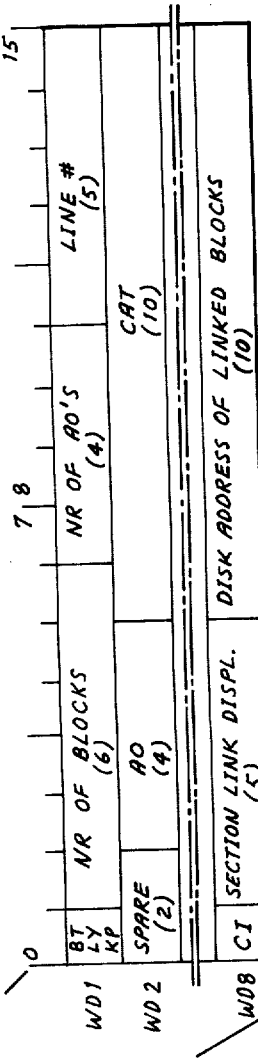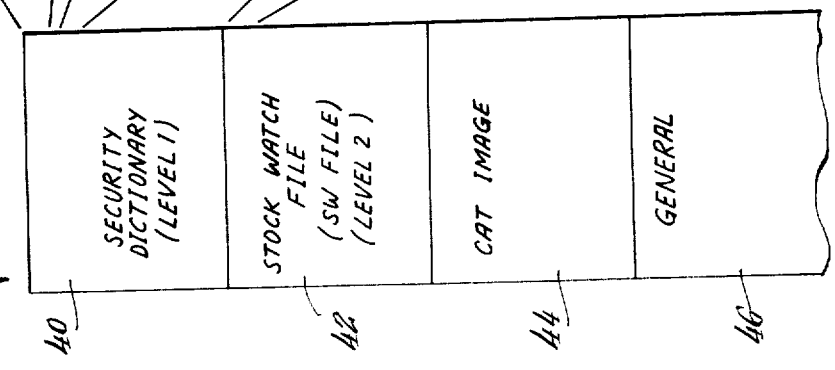

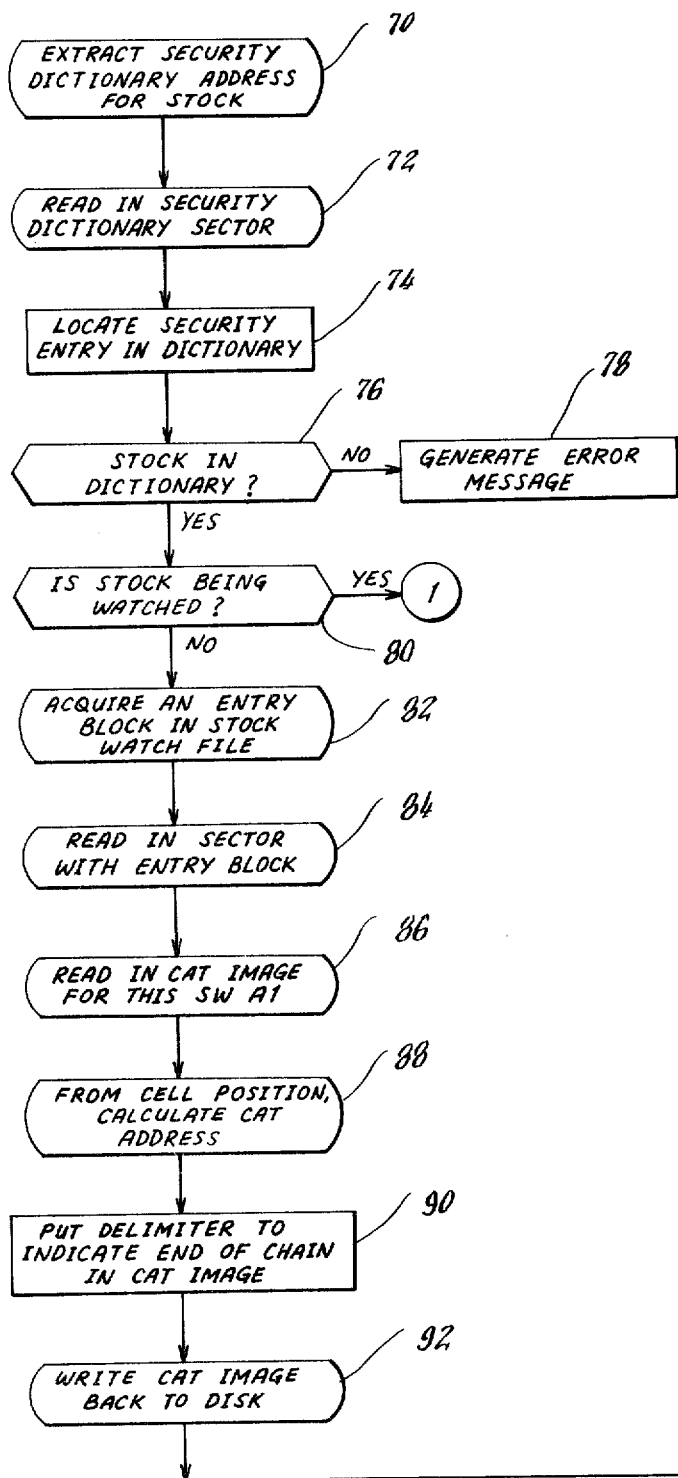
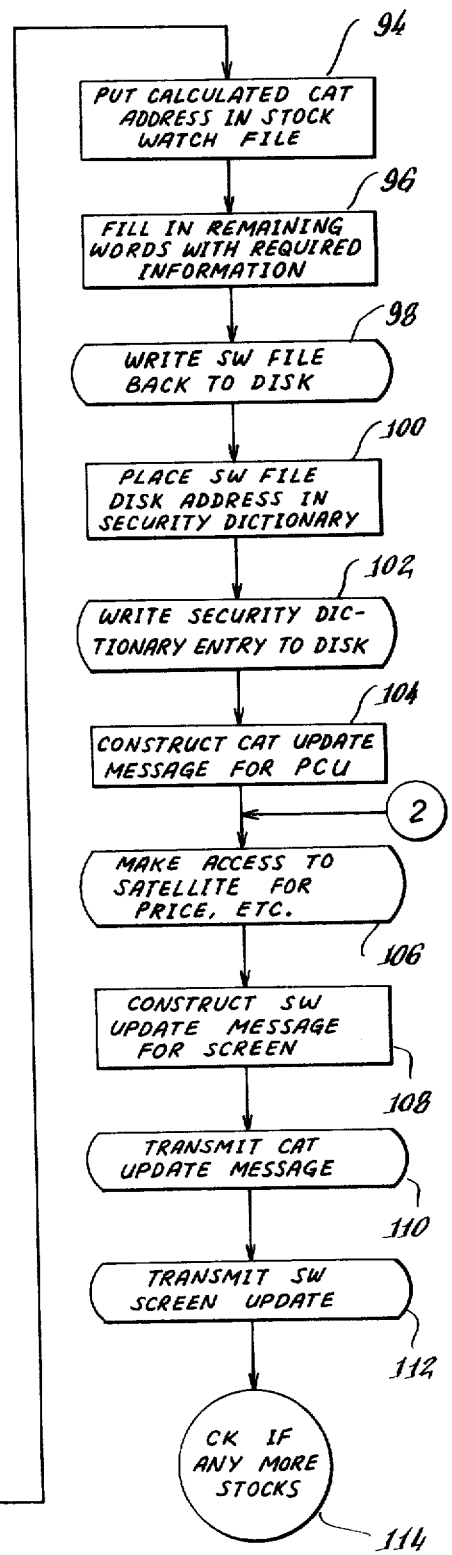
Fig. 6A.

Fig. 7.
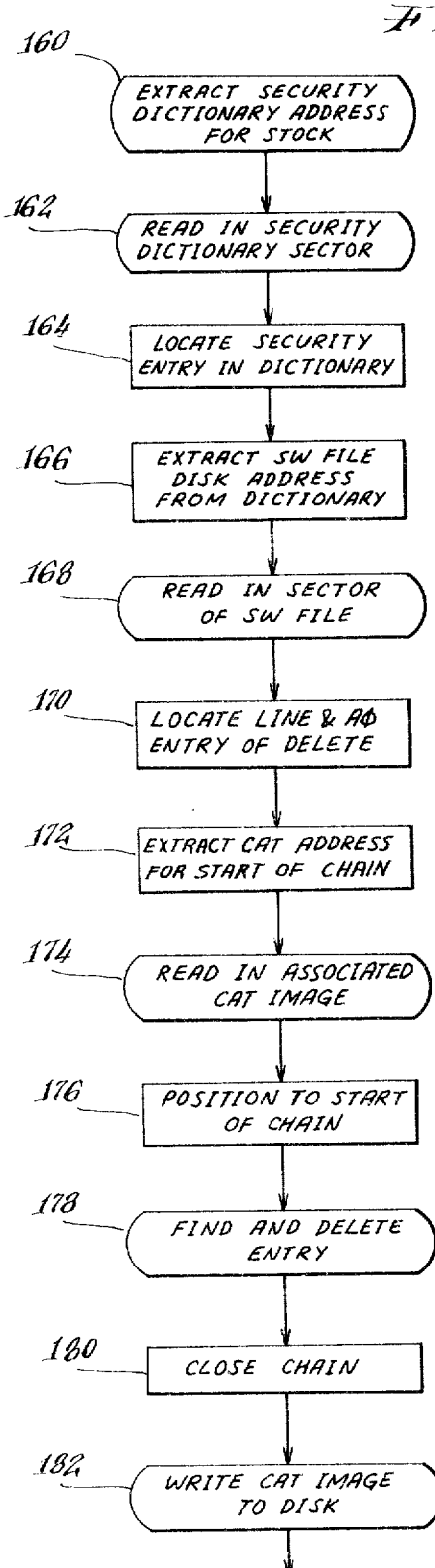
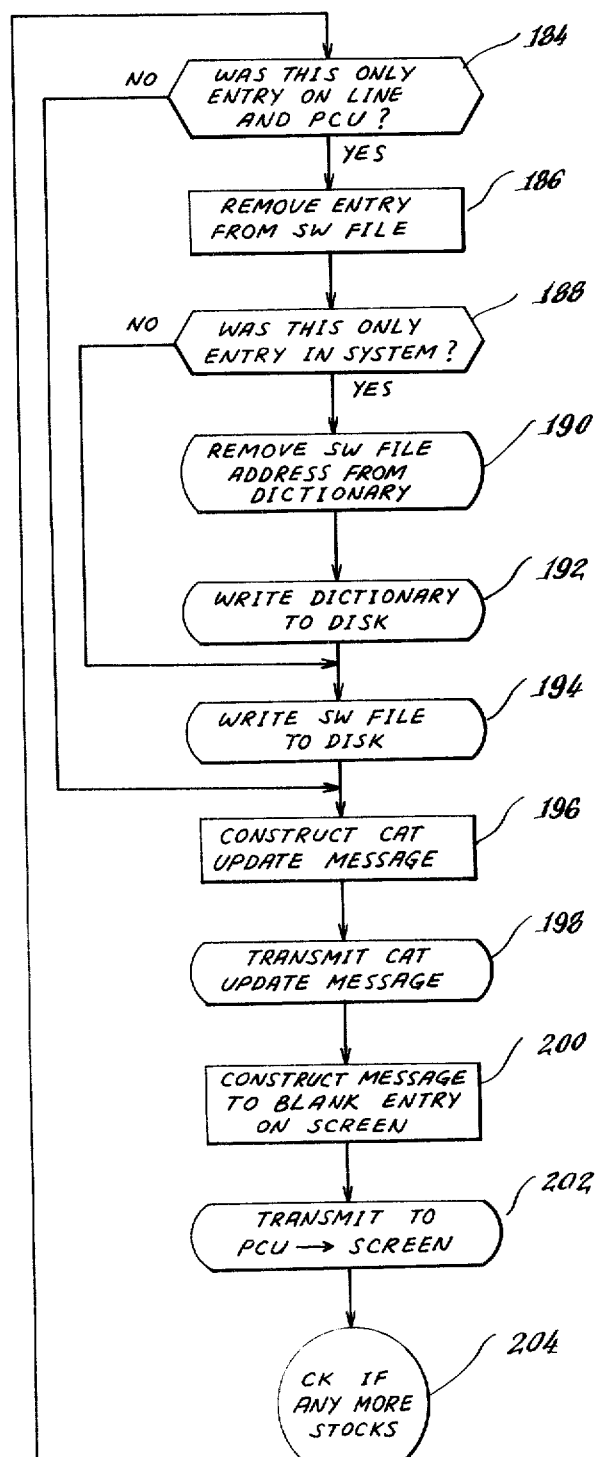

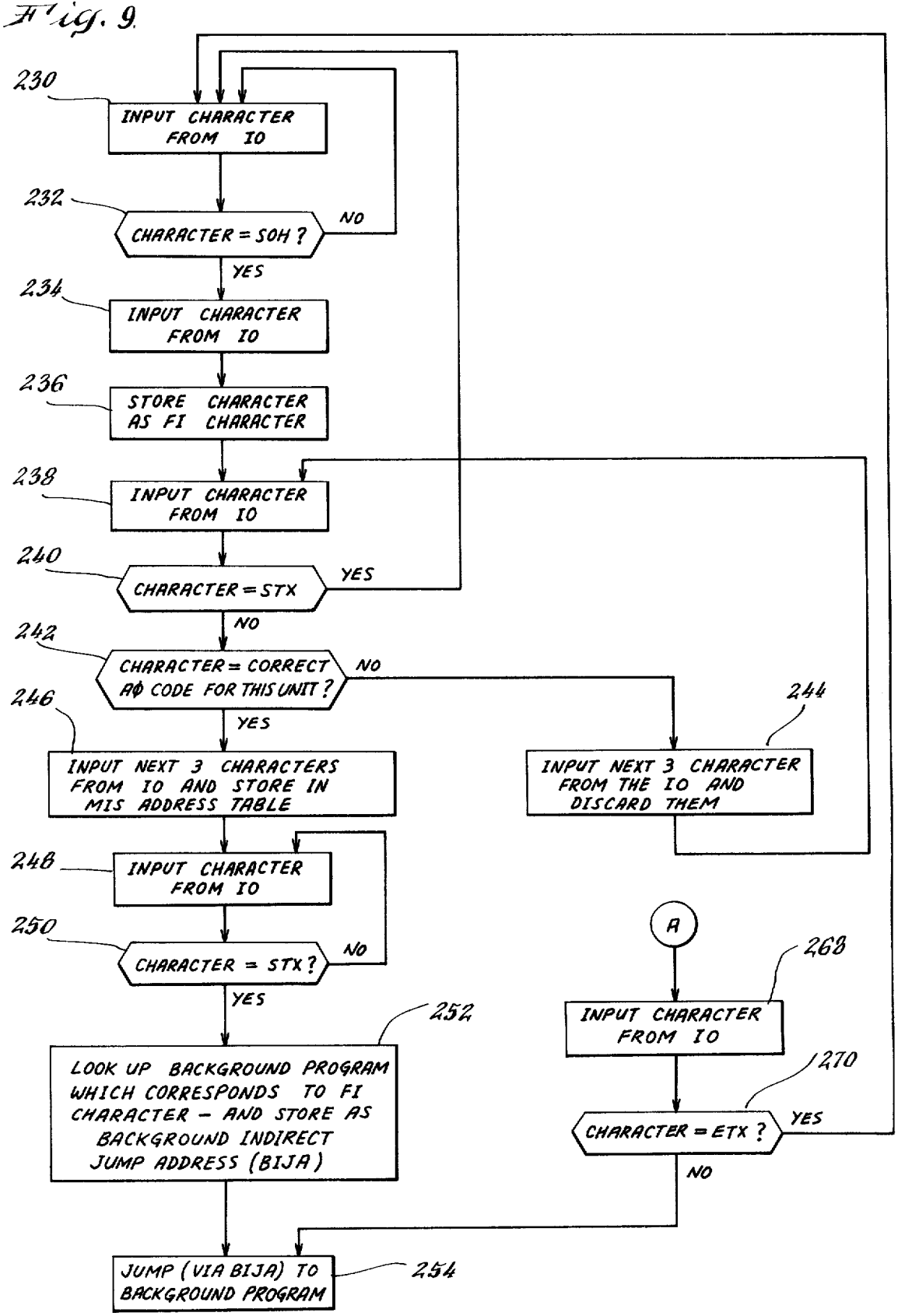

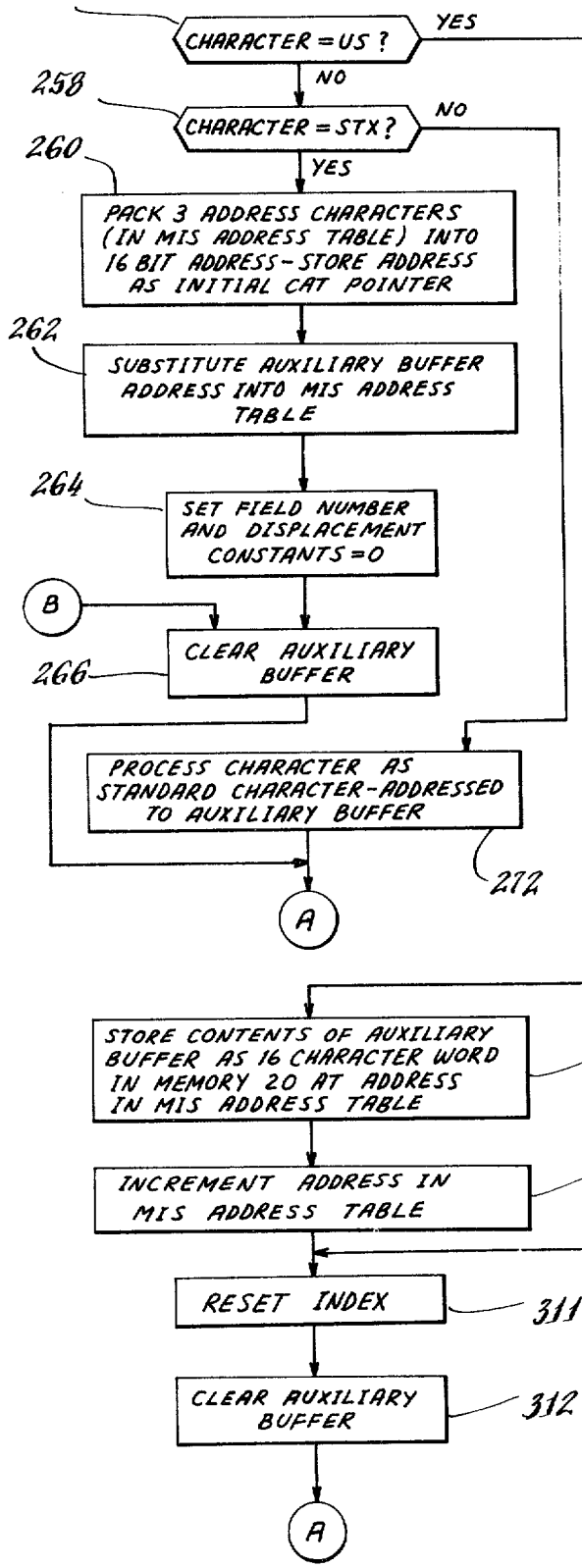
Fig. 10.
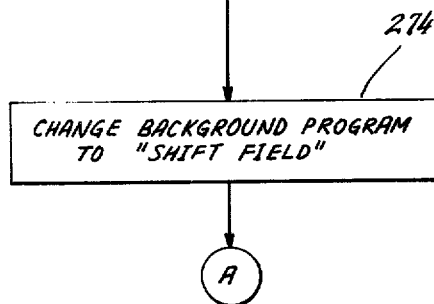
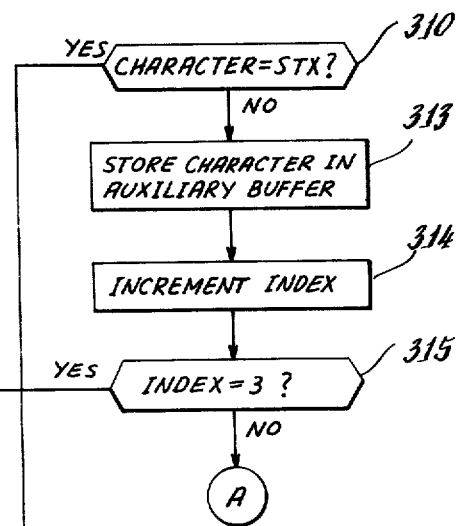
Fig. 12.

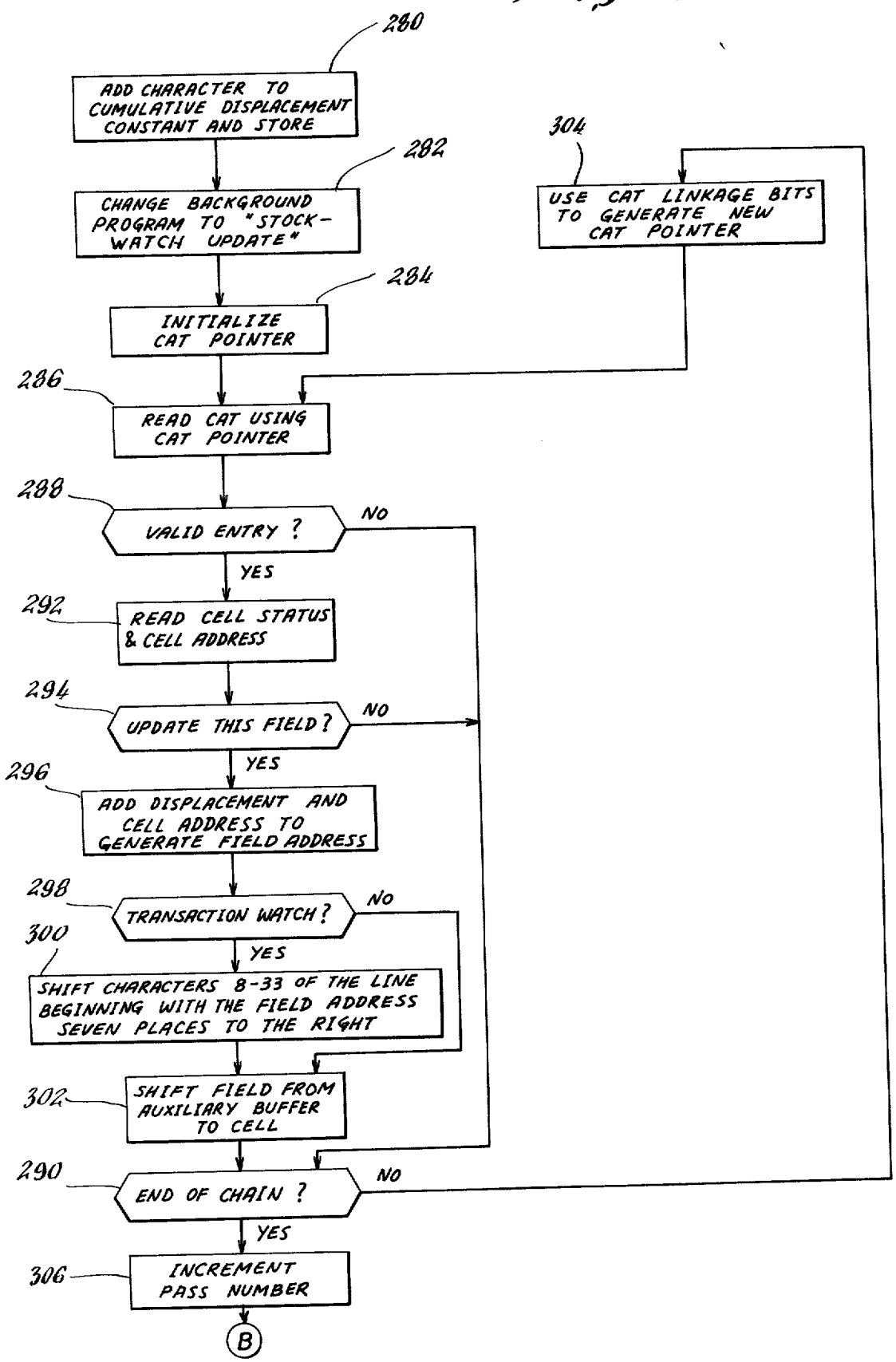

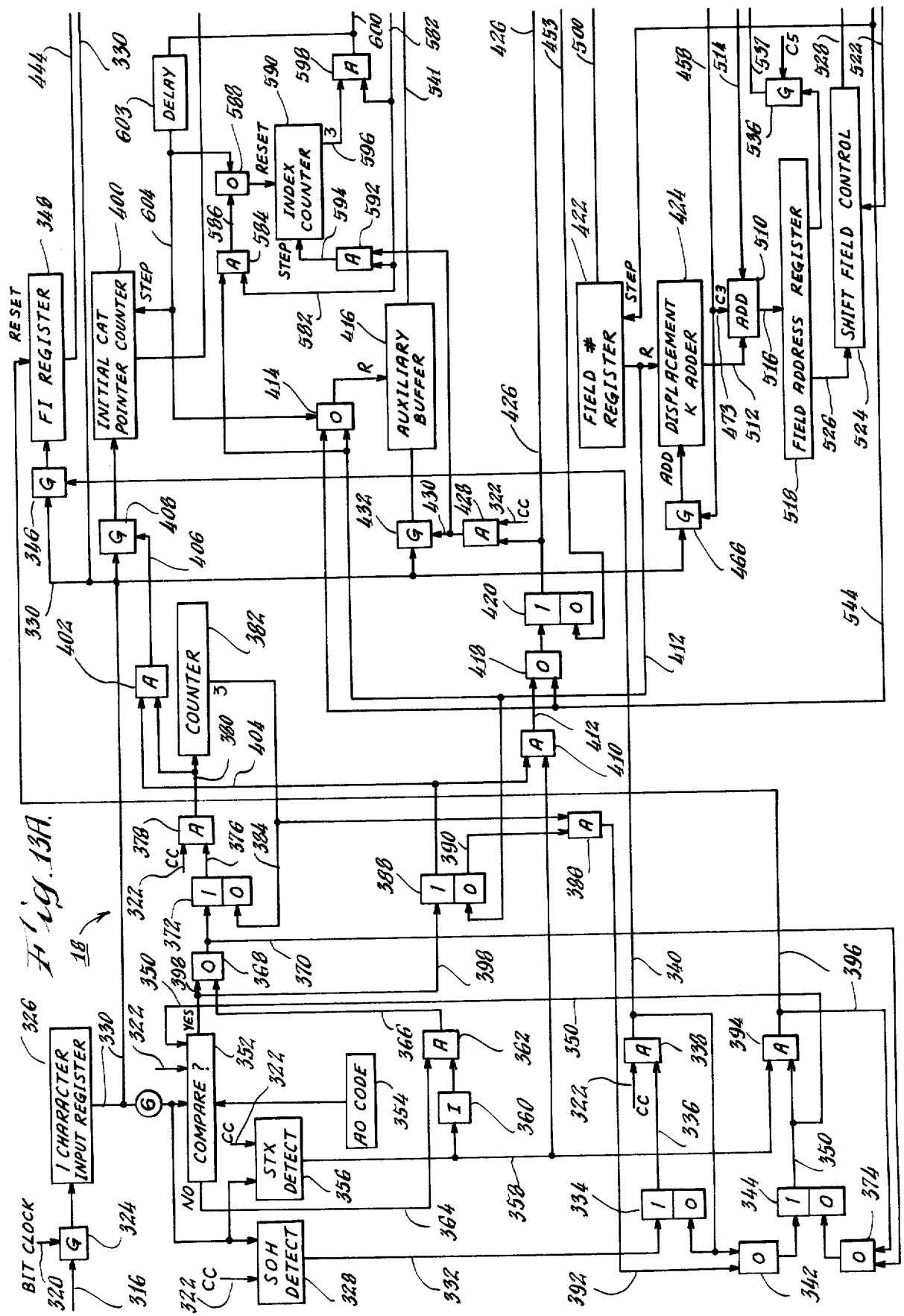

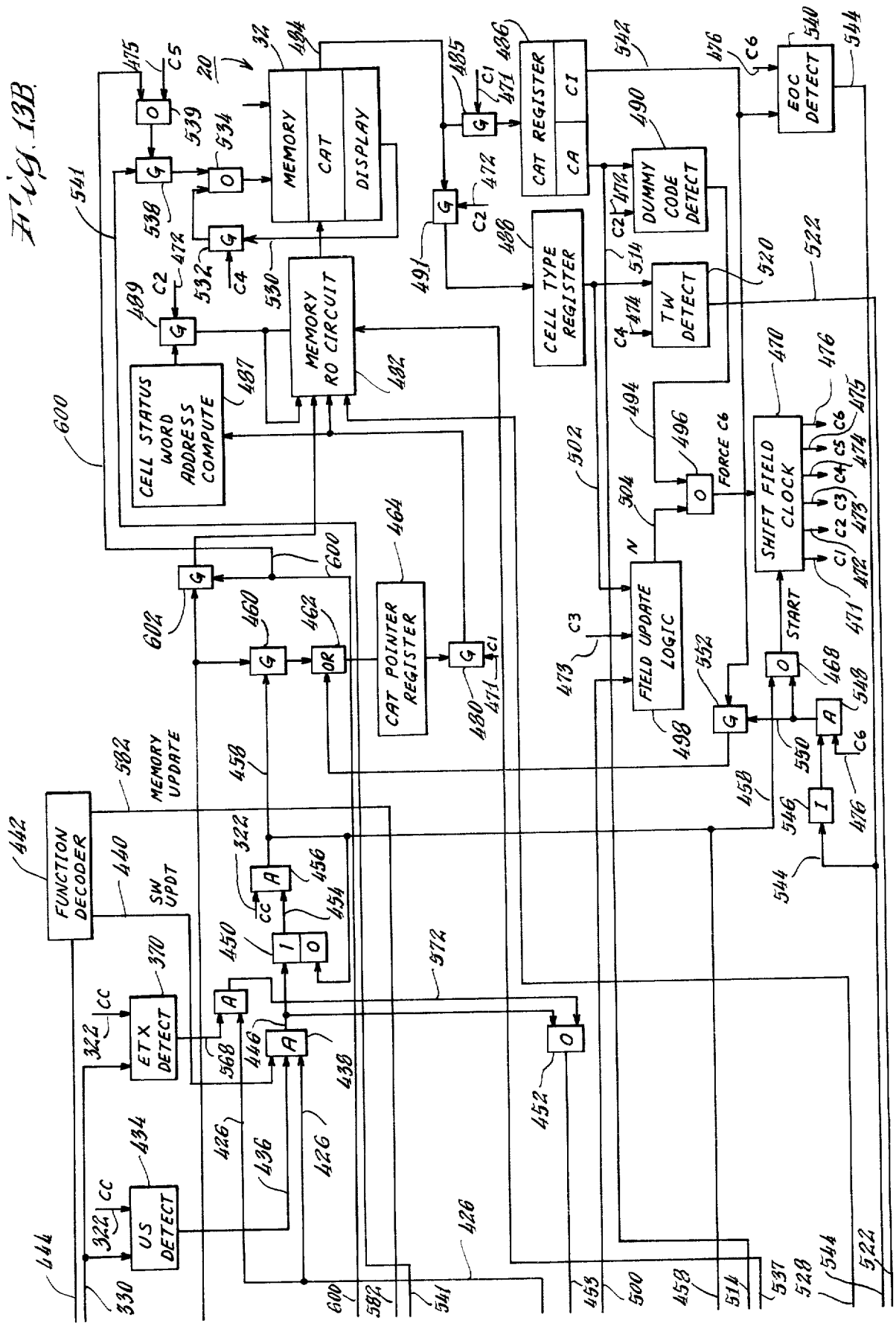

MEMORY UPDATE APPARATUS UTILIZING CHAIN ADDRESSING

This invention relates to a method and apparatus for updating information concerning selected items in an electronic memory device and more particularly to such a method and apparatus which permits information relating to a particular item in a plurality of different memory locations to be updated with a single update message.

There are numerous applications, particularly in on-line query and response systems, where an electronic memory is utilized to store information on a plurality of different items in various memory locations thereof. When a change occurs in the information relating to a particular item, this change must be recorded at all the memory locations storing information on the item. In one such application, the memory is being utilized to store information on various items such as stock quotations which information is applied to refresh the display on a plurality of cathode ray tube (CRT) terminals. In order to provide a flexible display format, each terminal is assigned a number of segments in the memory, each of which stores information to be displayed in a different format. Thus, one segment may store only last price for a plurality of different stocks while another segment may store last price plus a number of additional bits of information for a lesser number of stocks, with some or all of the stocks in the second segment being the same as various stocks of the first segment. A third segment for a given terminal might contain a list of succeeding prices on a single selected stock. The terminal operator may select the segment or segments to be utilized at any given time to refresh the display. Segments associated with other terminals may contain information relating to the same or different stocks as the segments for the first terminal, and may have a format which the operator of the terminal selects. Thus, information on a given stock may appear in a plurality of different locations within the memory.

In an application such as that indicated above, a problem arises when a change occurs in, for example, the price of a given stock. A central processing unit (CPU) may generate a separate message to a control unit of the memory for each location in which an item relating to the change is stored. However, since a large number of memories and control units are normally serviced by a single processor, and information relating to a particular item may be stored in a large number of locations in each memory, this approach would require a prohibitive amount of transmission time and is generally not feasible. Another alternative is to send a single "broadcast" message from the CPU to the memory control unit and provide adequate circuitry and control at the control unit to distribute information from the broadcast message to all of the memory locations requiring updating. This approach, while feasible, requires significant processing capability at the control unit. Since there are a large number of control units in a typical system, it is preferable that the cost and complexity of the control units be held to a minimum. One way of reducing the processing required at the control unit is for the broadcast message to contain, in addition to the update message, the address of each location where an update is required. While this approach requires significantly less transmission time than the first approach indicated above, and is therefore the most feasible of the three approaches, it can require very long messages, and thus significant transmission time particularly for an update on a popular item stored at many memory locations. Further, the length of the update messages may vary significantly when utilizing this approach, thus creating potential message queuing and related problems.

The update problem is complicated by the fact that a system of the type indicated above normally provides the operator with the capability of varying the individual stocks or other items on which information is being stored in each of the segments. Each time such a change is made, the system must be capable of adapting its update sequence so that the deleted items are no longer updated in the segment and the items added to the segments are updated. The requirement for performing this modification function adds to the complexity of the remote memory control unit particularly where the second approach indicated above is utilized.

A need therefore exists for a method and apparatus for permitting information on an item at a plurality of different locations in a remote memory to be updated with a single update message of relatively short and uniform length from the CPU without requiring extensive control circuitry at the remote station. Such a technique should also permit for the easy recording of modifications to the items on which the information is to be stored both at the central processor and at the remote memory.

SUMMARY OF THE INVENTION

This invention provides a system having a remote unit with a memory, the memory containing information relating to a plurality of different items. Information for a given item may be stored in one or more memory locations, there being no predetermined relationship between the locations in which information for a given item are stored. The method and apparatus of this invention is effective for updating the information relating to a given item at all locations in the memory at which information relating to the given item is stored with a single update message requiring a minimum of transmission time. The apparatus includes a means for storing a table having an entry for each item-storing location in the memory, each of the entries containing the address of the item-storing memory location and a chain address of another entry in the table for a location at which the item is stored. For a preferred embodiment, the table is stored in a section of the memory. The apparatus also includes means responsive to an update message relating to a given item for accessing a first entry in the table for the given item. There is a means responsive to the memory location address in the accessed table entry and to the update message for updating information for the item at the location and a means responsive to the chain address in the accessed entry for accessing the table entry at the chain address. The information updating and table entry accessing means are repetitively operative until all memory locations containing information relating to the given item have been updated. When an item is added to the memory, an entry for the new item is added to the chain for the item in the table, and when an item is removed from the memory, the entry for the item is removed from the chain and the resulting gap in the chain bridged.

BRIEF DESCRIPTION OF DRAWINGS

FIG. 2 is a diagram of an illustrative display on a terminal in a system of the type shown in FIG. 1.

FIGS. 3A through 3E are diagrams illustrating, in various levels of detail, the contents of a remote memory and of selected segments thereof.

FIGS. 4A through 4D are diagrams illustrating, in various levels of detail, the contents of at least the portion of a memory at a CC of FIG. 1 utilized in practicing the method of this invention.

FIGS. 6A and 6B, when combined, form a flow diagram of a technique utilized at a CC in accordance with the teachings of this invention to add an item to those on which information is to be stored.

FIG. 7 is a flow diagram of the technique utilized at a CC in accordance with the teachings of this invention for deleting an item from those on which information is being stored.

FIG. 9 is a flow diagram of the technique employed at the memory control unit (PCU of FIG. 1) for receiving a message.

FIGS. 10 and 11 are flow diagrams of the technique employed at the PCU for performing an item update from a received update message.

FIG. 12 is a flow diagram of the technique employed at the PCU for performing a normal memory update.

FIGS. 13A and 13B, when combined, form a schematic block diagram of an illustrative PCU circuit adapted for performing the functions of FIGS. 9–12.

DETAILED DESCRIPTION

Description of the System

Figure 1:
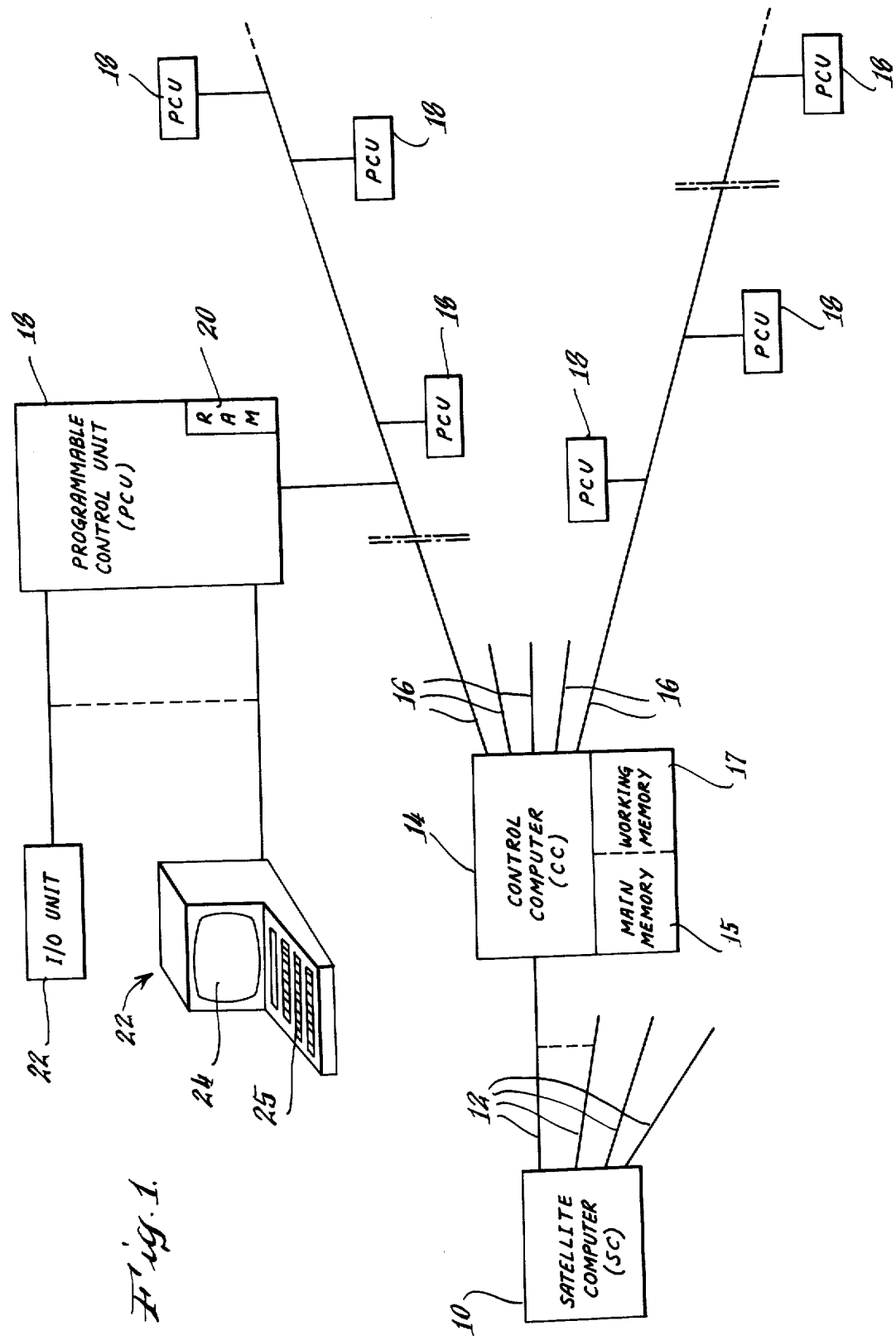
FIG. 1 is a block diagram of a system of the type in which the memory update method and apparatus of this invention might be employed.

FIG. 1 is a block diagram of an illustrative system in which the memory update method and apparatus of this invention might be utilized. While the system shown in FIG. 1 might be utilized for performing a variety of functions, for purposes of the discussion to follow it will be assumed that this system is being utilized to provide stock market information. Various aspects of a system of this type are described in greater detail in copending application Ser. No. 178,728 filed Sept. 8, 1971, now U.S. Pat. No. 3,792,462, on behalf of Richard C. Casey et al for a "Method and Apparatus for Controlling a Multi-Mode Segmented Display." This application is assigned to the same assignee as the present application.

For the stock market information function indicated above, the system of FIG. 1 will be considered to include a satellite computer 10 at which is stored information relating to price, volume, earnings and the like on substantially all stocks or securities traded on the major stock exchanges. Information may also be contained on certain stocks traded only on secondary stock exchanges or over the counter. Satellite 10 may be interrogated for information on a selected stock. However, this invention is more concerned with the messages that the satellite periodically puts out over lines 12 indicating changes in the information stored for a particular stock. These changes occur each time there is a transaction relating to the stock.

Connected on the end of each line 12 is a control computer or concentrator (CC) 14 having associated therewith a main memory 15 and a working memory 17. Main memory 15 may, for example, be one or more magnetic disks while working memory 17 may be a magnetic core memory. CC 14 is a mini computer which performs a variety of functions in the system. Of particular interest with respect to this invention is the operation of the CC to take a message on line 12 indicating that a change has occurred in information relating to a particular stock and utilizing this information to generate messages on each of its output channels or lines 16 addressed to the programmable control units (PCUs) 18 servicing input/output (I/O) units 22 which are watching the stock. As will be described in greater detail later, each of these messages contains, in addition to the new information on the stock, a list of PCU addresses where information concerning the stock is stored and for each PCU address an address in a random access memory (RAM) 20 at which is stored information to be utilized in updating RAM entries concerning the stock. The manner in which the message described above is generated will be described later. The PCU's are the memory control units previously mentioned.

The memory 20 at each PCU stores information to be displayed on the screen 24 of, for example, a cathode ray tube (CRT) display device at each I/O unit 22. As is described in greater detail in the beforementioned Casey et al application, the display on each of the screens 24 may be segmented so that information in up to three different formats may be displayed on each screen. FIG. 2 illustrates a display having information in three different formats of concern to the present invention: In the top section, last price only is displayed for eighteen different stocks. This is known as the "standard stock watch" format. With a display in this format, the user may select any combination of stocks to watch and the last price for each of the selected stocks shown on the display will be automatically updated by the system each time a transaction occurs on the stock. The middle section of the screen shown in FIG. 2 contains an "extended stock watch" display which includes last price, volume and time for up to nine different stocks. It is noted that several of the stocks in the center section correspond to stocks also being watched in the upper section. Thus, as a practical matter, the displays shown in these two sections would normally be viewed in the alternative, but are shown on the same display for purposes of illustration. The bottom section of the display in FIG. 2 contains what is referred to as a "transaction watch." Here, the price of the last five transactions on up to six selected stocks are displayed. The most recent transaction is in the left-most position with the positions to the right containing successively older transactions. Each time a new transaction on the stock is received, the prices displayed on the screen are all shifted right by seven character positions (one field) and the most recent transaction inserted in the left-most field. If there are five transactions displayed on the screen (as, for example, the display for IBM in FIG. 2) then, when a new transaction is received, information on the oldest transaction stored in the right-most field of the display is discarded.

While FIG. 2 has illustrated three different stock watching formats, it is apparent that many other stock watching formats, such as, for example, last, bid, ask, or high, low, last, or the like, on selected stocks, are also possible. A limit watch in which a price at which it is desired to buy or sell a given stock is recorded and the system is geared to generate an audible or visual response when a transaction at the limit price is recorded is also possible.

FIGS. 3A-3E form a map, in varying degrees of detail, of the contents of RAM 20. For purposes of the present discussion, RAM 20 will be considered to be a magnetic core memory array although various solid state, thin film or other memories might also be utilized. From FIG. 3A it is seen that memory 20 has three basic areas. The first area 30 which is illustrated as filling 1,279 addressable memory words contains control information, the function of which was described in detail in the beforementioned Casey et al application. This area of memory is not utilized in connection with the present invention. The second area of memory, area 32, contains a common address table (CAT) 32. This area of memory represents a basic part of this invention and will be described in more detail later. The third area of memory, and by far the largest area, is area 34 which contains information to be utilized in refreshing displays 24 at I/Os 22. Area 34 of memory is made up of a number of memory segments each of which contains information to be displayed on three lines of a six line display section. Thus, the stock watch information line displayed in the top section of the display in FIG. 2 would be stored in two adjacent segments of memory in area 34, the extended stock watch information in the middle section in a second pair of memory segments and the transaction watch information in the bottom section of the display in a third pair of memory segments. Since in the system of the beforementioned Casey, et al application, the information being displayed in each section may be changed, at least six sections, and generally many more, are provided in area 34 of memory 20 for each I/O unit display 24.

FIG. 3B illustrates the character addresses which appear within a single pair of the display segments. The function of these character addresses will be described in greater detail later. A single cell for a stock wash display containing information relating to a single stock is shown outlined in heavy lines.

As indicated previously, the CAT table stored in CAT area 32 of memory 20 is a basic element of this invention. Area 32 of memory is also divided into a plurality of three line segments, the number of these segments being dependent on the number of I/O units 22 associated with the PCU 18, and on the number of stock watching formats utilized in conjunction with each I/O unit. FIG. 3C shows an exemplary CAT area 32 consisting of 768 words of memory. This area is broken down into twelve three line segments. Since each three line segment is, as will be apparent from the discussion to follow, capable of storing information required to access three six line display or memory sections, the number of three line segments required for the CAT table for a given application will be equal to the number of six line stock watching sections in area 34 of memory divided by three. The twelve segments shown in FIG. 3C are thus adapted for servicing 36 stock watching sections.

FIG. 3D illustrates the contents of a single three line segment in the CAT area 32 of memory. From this figure it is seen that the first four words, word 0 through 3, are not used. These words normally contained control characters which are not utilized in the setments of CAT area 32. The remaining 60-words of the memory segment are divided into three lines of 20 words each, each line containing information relating to the information stored in a single six line memory segment. Each word is sixteen bits long. FIG. 3E illustrates the contents of the 20 words for a single line of the segment. From FIG. 3E it is seen that words 1 through 9 and 11 through 19 of each line contain information relating to the 18 possible cell addresses in a pair of memory segments (see FIG. 3B). Thus, word 1 contains information relating to the first cell of the segment, word two to the second cell of the segment and so on. Bits B1 through B10 of each of these words contains a forward chain address or CAT linkage address. As will be described in greater detail later, the 10 bit chain address is a link to another word in the CAT table corresponding to a cell containing information on the same stock. The address stored is the relative address of the word in the CAT table and must, for the memory shown in FIG. 3A, have the six most significant bits representing the area of memory in which the CAT table is stored added to it in order to obtain the absolute address of the word in the CAT table which it is being linked to. The manner in which the chain address is utilized will be described later. Bits 11 through 16 of each of these words contains the cell address of the entry in area 34 of memory corresponding to the CAT word. The cell address is the address of the word in memory that stores the first two characters of the given cell. The manner in which the absolute cell address is computed from the cell address stored in the CAT table will be described later.

Bits B1 through B8 of the tenth word has the A1 or segment address in area 34 of memory for the cell indicated by words 1 through 9 while bits 1 through 8 of the twentieth word contains the A1 or segment address for the cells corresponding to words 11 through 19 on the line of the CAT entry. Two separate segment addresses are required since some displays may contain three rather than six lines and there are therefore only three lines to a memory segment. Bits 9 through 16 of the tenth and twentieth word of each CAT line are used to store a code indicating the type of stock watching information stored in the segment. This code would normally be identical for both words. Thus, a first code in these bit positions might indicate that the corresponding segment in area 34 of memory contains standard stock watch information (see top section of FIG. 2) while a different code would indicate that the segment contains extended stock watch information (see middle section of FIG. 2). Still a third code would indicate transaction watch (see lower section of FIG. 2). Other codes might indicate limit watch or other stock watching formats. As will be seen later, the information on the stock watch type is utilized to determine what information from an update message received at a PCU 18 is utilized to update the information in the corresponding cell and where in the cell this information is stored.

As indicated previously, there is also a memory 15 at CC 14. This memory contains information utilized in performing the various functions of the CC. Of particular interest in connection with this invention are the four areas shown in FIG. 4A. The first of these areas, area 40, contains a security dictionary. This will also sometimes be referred to as the level 1 area. This dictionary is used to indicate if a security on which a stock watching request is made is a valid security. For each security, it also gives a level 2 or stock watch file address where information relating to the security in question begins. Other functions of the security dictionary will be described later.

The security dictionary has a number of sectors each of which contains 32 eight word entries. Each eight word entry (FIG. 4C) contains in its first two words a security ID which may be up to five characters long. The third word contains the disk track address in the stock watch file (area 42) at which information concerning the identified stock is stored and the block number on the track where this information begins. The remaining five words of each entry are either spares or contain information of no concern to the present invention.

In addition, the security dictionary has a resident index (FIG. 4B) which lists, for each sector in the security dictionary, the first stock ID of the sector. Since the stock IDs are stored in the security dictionary in alphabetical order, the information in the resident index may be utilized, as will be seen later, to locate the sector in which the information concerning a particular stock is stored. While the resident index may be stored in main memory 15 as shown, it should also be permanently stored in working memory 17. This will be assumed to be the case in the discussion to follow. Each entry in the index is three words long with an up to five character stock ID being stored in the first two words. The third word indicates the number of stocks in the sector being watched.

The second area, area 42, of memory 15 is the stock watch file (SW file) or level 2 area of the memory. This area of memory indicates the first CAT address at each PCU 18 for each security in the system. This area of memory is broken down into blocks with all the information in a given block relating to a single security. FIG. 4D is a map of the information contained within a single block of SW file 42. Referring to FIG. 4D, it is seen that the first word of the block contains information indicating the number of blocks containing information relating to the security, the number of PCUs 18 (designated by A0 addresses) on the line 16 corresponding to the block having terminals watching the particular stock, and the number of the line 16 associated with the block. The second through the seventh line of the block contain a PCU (A0) address and the CAT address of the first entry in the chain for the security at the indicated PCU. The last word of the block contains a linking or chain address to an additional block of the stock watch file containing information relating to the particular stock. If PCUs on only a single line 6 are watching the particular stock, then the SW file for the stock can be contained within a single block. For each additional line having at least one PCU watching the stock, an additional block in the SW file is required.

The third area of memory 15 of interest in connection with this invention is the CAT image area 44. This area contains an exact image of the information stored in the CAT area 32 at each of the PCUs 18. There is thus a CAT image portion in area 44 for each PCU. As will be seen later, many of the manipulations for update and modification are performed in the CAT image table and a message then generated to store the information in the CAT table at the appropriate PCU. The CAT image in area 44 is also used to recover the CAT when, for some reason, the CAT is lost at the corresponding PCU.

Area 46 of memory 15 contains general information which is utilized in forming and querying the various messages which are sent from the CC over lines 16 to PCUs 18.

DESCRIPTION OF OPERATION

Item Modification Operations at CC

Figure 5:
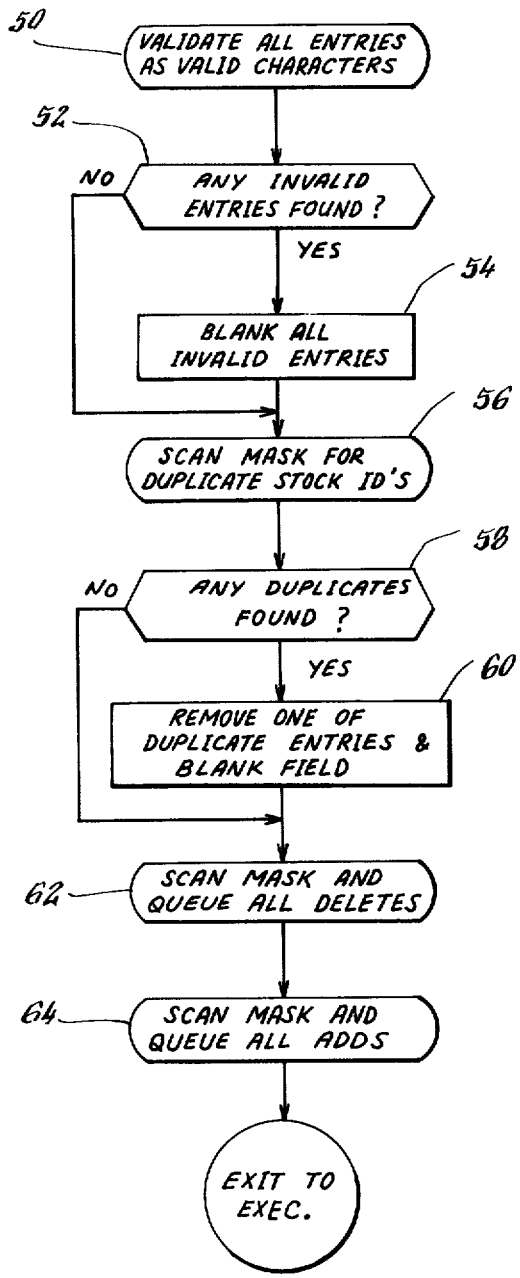
FIG. 5 is a flow diagram of an editing technique utilized at a CC as a first step in modifying items on which information is to be stored.

FIG. 5 is a flow diagram of the preliminary operations which are performed at the CC 14 when a message is received from a PCU indicating that a change is to be made in one or more of the stocks being watched in a particular segment of the memory and display. As described in greater detail in the beforementioned Casey, et al application, the updating is accomplished by supplying to the operator, on request, a mask indicating the stocks he is presently watching. If he is not watching any stocks, he will receive a blank mask. The operator then uses keyboard 25 of his terminal to make changes in the displayed mask or to record securities in blank spaces. When the operator has completed the changes he wishes to make, the mask, with the modifications, is transmitted to the corresponding CC 14 where the new mask is compared with the one orginally sent and the changes noted.

After the above operations have been completed, the first step in the routine for implementing the changes, step 50, is performed. During this step a determination is made as to whether all of the characters entered are valid. This involves checking to see if, for example, a numeric has been entered as part of a stock ID. Step 52 is a branch step during which, if any invalid entries are found, the system is caused to branch to step 54. During step 54 any invalid entry detected during step 50 is blanked and ignored. The remaining valid entries are processed. When the operation has been completed, the operator will receive a display with the invalid entry blanked and will in this manner be advised of his error. However, since the system proceeds to process the valid entries, the operator need only reenter the one invalid entry rather than the entire sequence.

From step 52 if all entries are found valid, or from step 54 if one or more entries are found invalid, the operation proceeds to step 56. During step 56, the mask which the operator entered is scanned to determine if it contains any duplicate stock IDs. If during step 56 a duplicate stock ID is found, branch step 58 causes the operation to proceed to step 60 during which one of the duplicate entries, normally the second one, is removed and the field in which it was stored blanked. The significance of the blank field is the same here as it was for the situation where an invalid entry is recognized.

From step 58 if a duplicate entry is not found, or from step 60 if a duplicate entry is found, the operation proceeds to step 62 during which the mask is again scanned and compared with the previous mask to determine securities which are to be deleted from the memory. The determined deletes are then queued for processing. During step 64, the next step in the operation, the mask is scanned to determine the securities which have been added for display and these added entries are also queued. When these preliminary operations have been completed, the system is ready to enter the various requested modificiations in the tables and other required locations in memories 15 and 20.

Figure 6B:
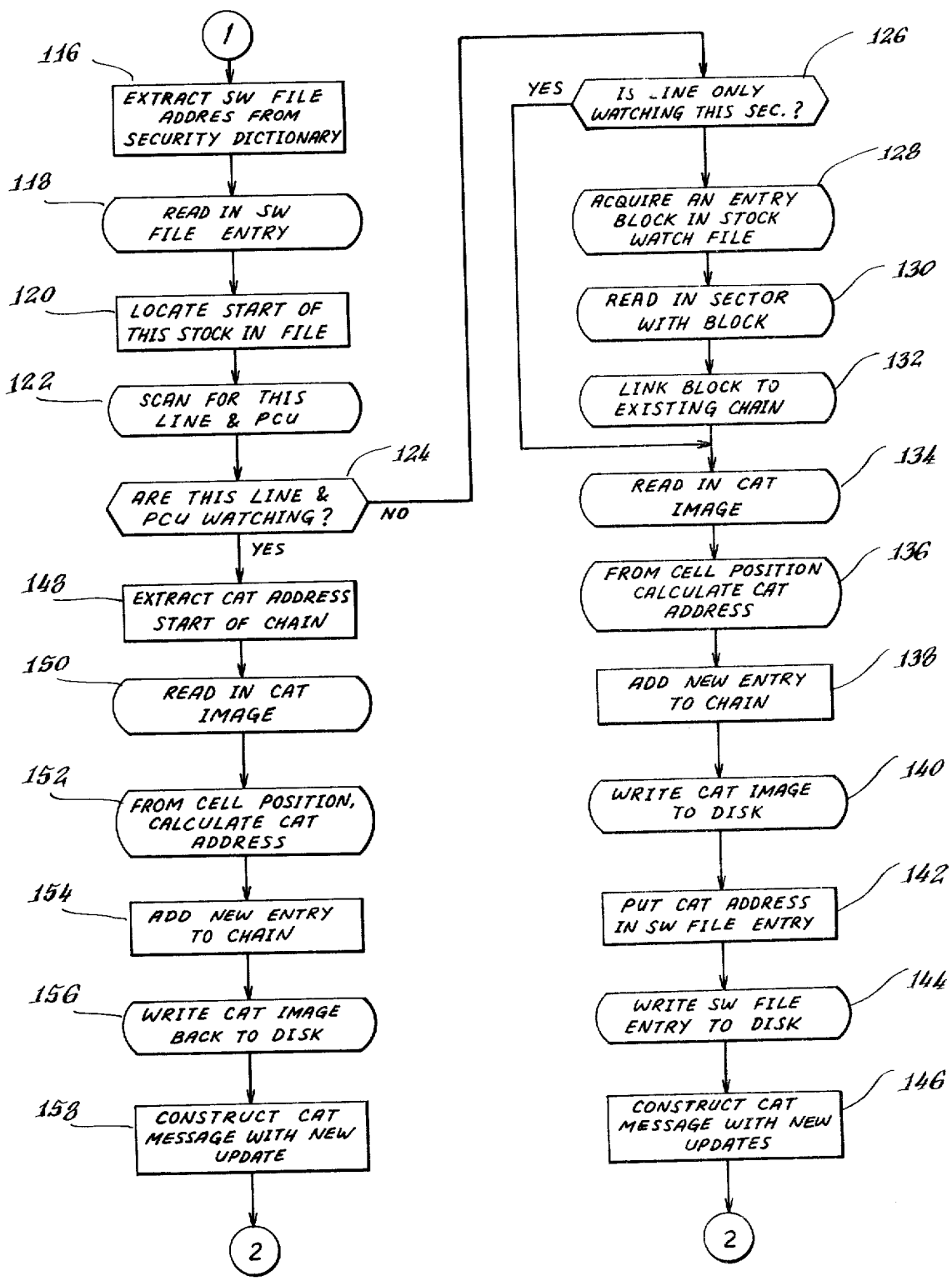

FIGS. 6A and 6B illustrate in flow diagram form the various operations which are performed in order to add a new entry into the system. This routine would be repeated for each of the securities queued during step 64 (FIG. 5). Referring to FIG. 6A, the first step in this operation, step 70, is to extract the security dictionary address for the security. This step is accomplished by reference to the resident index (FIG. 4B). The security is located in the sector, the starting ID for which is alphabetically just below the ID for the security being added. A standard look-up compare operation is performed to locate the required sector.

From step 70, the system proceeds to step 72 during which the sector determined during step 70 is read out of memory 15 and into a working area of memory 17 at CC 14. Duringn step 74, the next step in the operation, a look-up compare operation is performed to locate the entry for the stock being added in the extracted sector of the security dictionary. If the stock is not in the security dictionary, this means that the requested stock ID is an invalid ID (or at least that the stock represented by the ID is not in the system) and a "No" output is obtained during step 76. When a "No" output is obtained during step 76, the system branches to step 78 during which an error message is generated indicating to the operator that the requested ID is invalid.

If the stock is found in the security dictionary, the system branches to step 80 during which a determination is made as to whether the stock is presently being watched. If the stock is presently being watched (i.e. if there is at least one entry for the stock in area 34 of a memory 20 for at least one of the PCUs 18) then there is an entry for the stock in stock watch file 42. The operations which are performed under these conditions will be described shortly.

If information concerning the stock is not presently being stored at any PCU serviced by the CC 14, this will be indicated by the absence of a level 2 address in the security dictionary entry for the stock. Under these conditions, an entry must be made in the stock watch file for the stock. The first step in this operation, step 82, involves the acquiring of an empty block in the stock watch file area of memory 15. It will be remembered, referring to FIG. 4D, that at least one eight word block is provided in the stock watch file for each stock. During step 84, a sector in memory 15 containing an empty entry block is read into working core memory 17, and during step 86 the portion of CAT image area 44 containing information relating to the PCU (the A1 address) where the change is requested is also read into working memory.

The next step in the operation, step 88, is to determine the CAT address for the new entry. FIG. 3C indicates the most significant bits for each three-line segment in the CAT table. The word address within the segment for the new entry may be determined by noting the line in the segment which corresponds to the display in which the change occurs. From FIG. 2, it is seen that there are nine possible entries in each three lines of the display corresponding to the first nine words of the CAT line corresponding to that display. Each possible entry in the display is referred to as a cell and each of these entry positions as a cell position. There may not be a separate stock entry for each cell position. This is illustrated by, for example, the expanded stock watch display in the center section of FIG. 2. Where this occurs, the words in the CAT table corresponding to the cell positions which do not contain a stock entry are left blank. By noting the cell position for the new entry, the CAT address for the entry may be easily computed.

Since the entry being made in the CAT table for the new stock being added to the display is the only entry in the CAT image for this stock, the end-of-chain delimiter is recorded in the CAT linkage area of the entry at the determined CAT address (step 90). When step 90 has been completed, the writing of a new entry in the CAT image has been completed and the CAT image may be written read back from working core into the disk (step 92).

During step 94, the next step in the operation, the calculated address is stored as the CAT address in the second word of the entry block acquired during step 82. As will be seen later, this address is utilized for accessing the CAT table at the PCU when a change occurs in the selected security. During step 96 the remaining words in the entry block of the stock watch file are filled in with information derived from other areas of memory 15. In this instance, the number of blocks, and number of AOs, would both be one and there would be no block link address. When the entry block has been completed, it is written read back from core or other working memory 17 into the disk or other back-up memory 15 (step 98).

During step 100, the next step in the operation, the address in the stock watch file of the entry block in which information concerning the security is stored is read into the entry for the security in the security dictionary and, during step 102, the security dictionary sector brought out during step 72 is written back into main store 15.

During step 104, the next step in the operation, a CAT update message for the PCU is constructed. This message is in the following form:

SOH FI $A_u$ X1X2X3 STX $F_1 - F_n$ ETX

Where:
SOH is the start of header character;
FI is a function indicator telling the type of message (in this instance a CAT update message);
$A_u$ is the PCU address;
X1X2X3 are the characters of the address in the CAT table of the word being updated;
STX is a character indicating the end of the address portion of the message and the beginning of the data portion of the message;
$F_1 - F_n$ are characters containing the CAT update information (containing the information to be written as the new CAT entry);
ETX is the end of message character.

A standard message assembly program of the CC processor may be utilized to assemble the information required for the CAT update message.

In addition to updating the CAT table entry, an entry for the security must also be made in area 34 of memory. This entry will include the latest price and/or other information required for the security in the selected format. Therefore, during step 106, an access is made to satellite computer 10 to obtain the required price and other information. During step 108, the update message for the stock is constructed. This message will be of the same form as that indicated above for the CAT update message with the X1X2X3 address being the address for the stock in the CAT table and the $F_1 - F_n$ characters containing information relating to the new security including its ID and price. During step 110 the CAT update message is transmitted along the appropriate line 16 to the PCU 18. When the transmission of the CAT update message has been completed, the stock watch screen update message constructed during step 108 is transmitted to the PCU (step 112). The manner in which these messages are received and utilized at the PCU to effect the required updates will be described later. When step 112 has been completed, all operations required at CC 14 have been completed for the adding of a new stock watch entry. The operation thus proceeds to step 114 during which a check is performed to determine if there are any more stocks to be added to the system. If there are, the operation returns to step 70, with this step, and those that follow being repeated for the new stock.

If during step 80 it is determined that the stock to be added is being watched by at least one IO unit serviced by the CC, (i.e. there is an entry for the stock in stock watch file 42) the operation branches from step 80 to step 116 (FIG. 6B). During step 116 the stock watch file address for the stock is extracted from security dictionary 40. This is accomplished by use of a standard look-up compare operation to locate the desired stock ID in the security dictionary sector read into working memory 17 during step 72.

When the stock watch file address is determined, the stock watch file entry at this address is read from memory 15 into working memory 17 (step 118). During step 120, the next step in the operation, the location of the beginning of the entry for the stock is located in the stock watch file and during step 122 the stock watch file entry is scanned to determine if the line 16 and PCU 18 at which the stock is to be added are now watching the stock. As will be seen shortly, if the PCU is not now watching the stock, a new entry will be required for that PCU in the stock watch block for the line while if none of the PCUs on the line are watching the stock, then a new entry block for the stock and line must be acquired. Under either of these conditions, the operation branches from step 124 to step 126.

During step 126 a determination is made as to whether any of the PCUs on the line 16 are watching the security which is to be added. If none of the PCUs 18 on the line 16 are watching the security, the operation branches to step 128 during which an empty entry block in stock watch file 42 is acquired. During step 130 the sector containing the acquired entry block is read into working memory. During step 132 the acquired entry block is linked to the existing chain. Referring to FIG. 4D, this involves the writing of the acquired block address into the link address word (word 8) of the last block in the stock watch file entry read in during step 118.

Once step 132 has been completed, the system is in the same condition as it would be in if one of the PCUs on the line 16 had been watching the stock. Thus, from step 132 if there is a "No" output during step 126, or from step 126 if there is a "Yes" output during this step, the operation branches to step 134. During step 134, as during previously described step 86, the CAT image for the I/O 22 at which the addition is to be made is read into working memory and during step 136 the CAT address for the entry is calculated from its cell position. The manner in which this calculation is performed has been previously described in connection with step 88.

During step 138, the next step in the operation, the new entry is added to the chain in the CAT image table. Referring to FIG. 3E, it is seen that each word in the CAT table contains a CAT linkage to another word in the CAT table relating to the same security. Where a chain has already been formed at the PCU for the security, the new entry must be added into the chain. However, since step 138 is performed when the entry is the first one in the PCU, no updating of the chain is required and the entry in the CAT image may thus have the end-of-chain delimiter inserted in its CAT linkage area. When this is done, the system proceeds to step 140 during which the CAT image is read back into main disk memory 15. During steps 142 and 144 the CAT address calculated during step 136 is stored in the stock watch file entry and the stock watch file entry is read back into main memory 15. During step 146 a CAT update message for the PCU is constructed in the same manner as this message was constructed during previously described step 104. The operation then branches to step 106 (FIG. 6A) to construct the stock watch update message and to transmit the constructed messages to the indicated PCU.

If during step 124 it is determined that the line and PCU at which the addition is to be made are both watching the stock, this means that there is already an entry in the stock watch file for the stock and PCU and the system therefore branches to step 148. During step 148 the CAT address at which the chain for the stock begins for the given PCU is determined. This operation is accomplished by locating the word in the stock watch file (FIG. 4D0 for the PCU at which the addition is to and 4D) and extracting the required CAT address from the located word. During step 150 the CAT image from area 44 of memory 15 for the PCU and IO unit at which the addition is to be made is read into working memory and during step 152 the CAT address for the new entry is calculated from its cell position in the same manner in which this calculation was performed during step 88 (FIG. 6A).

During step 154 the new entry is added into the chain for the security in the CAT image table for the PCU. This may be accomplished by going through the linkage chain for the stocks starting at the address obtained from the stock watch file. However, a faster and easier procedure is to change the linkage address (FIG. 3E) at the entry indicated in the stock watch file to the CAT address calculated during step 152 and to then insert the linkage address which was in the entry indicated by the stock watch file as the linkage address of the new entry. The new entry thus becomes the second entry in the chain.

During step 156 the CAT image is written back from working memory into main memory 15 and during step 158 CAT update messages are constructed. It should be noted that since two entries in the CAT table have been changed (i.e. the first and second entries) two CAT update messages are required in order to effect the required updates. These messages are of the form and are generated in the manner indicated previously with respect to step 104. From step 158 the operation returns to step 106 to construct a stock watch update message and to transmit the CAT update messages and stock watch update messages to the PCU.

STOCK WATCH DELETE

FIG. 7 illustrates the operations which are performed at CC 14 in order to effect the deletion of an entry from a PCU and its CAT table. Referring to this figure, the first step in the stock watch delete operation, step 160, is to extract the security dictionary address for the security. This step involves the use of the resident index (FIG. 4B) and is identical to step 70 (FIG. 6A) previously described. During step 162 the security dictionary sector containing the stock, as determined during step 160, is read from main memory 15 into working memory 17 and, during step 164, the security entry is located in the dictionary. These latter operations are identical to steps 72 and 74 previously described.

During step 166, the next step in the operation, the stock watch file disk address for the stock is extracted from the dictionary and during step 168 the sector containing the extracted stock watch file address is read from main memory into working memory. The stock watch file sector in working memory is then scanned using a standard look-up compare operation to locate the block of the line and the A0 (PCU) address at which the delete is to occur (step 170). When the proper word is located during step 170, the CAT address for the start of chain for the stock at the given PCU is extracted (step 172).

During step 174, the next step in the operation, the CAT image entry from CAT image area 44 of memory for the PCU at which the deletion is to occur is read into working memory. During step 176 the CAT address extracted during step 172 is utilized to address the first entry for the stock in the CAT table of the PCU at which the delete is to occur. During step 178, the chain at the PCU is followed until the CAT entry corresponding to the entry being deleted is located and this entry in the CAT table is itself deleted. The deletion of an entry in the middle of the chain leaves a gap in the chain which must be closed. This is accomplished during step 180 by taking the link address from the deleted entry and writing it as the link address in the proceeding entry of the chain. An alternative procedure is to delete only the cell address portion of the CAT entry during step 178 leaving the chain in tact. With this procedure, step 180 is not required. When step 180 has been completed, the CAT image information is read back from working memory into the main disk memory (step 182).

If the deleted entry is the only entry for the stock at any PCU on the line 16 leading to the PCU from which the entry is deleted, then the stock watch file block for the line and stock should be removed. Thus, during step 184, a determination is made as to whether the deleted entry is the only one for the line. If the entry is the only one for the line, the stock watch file block is removed from memory during step 186. From step 186 the operation proceeds to step 188 during which a determination is made as to whether the removed entry is the only one for the stock in the system. If the removed entry is the only one in the system for the stock, the operation branches to step 190 during which the stock watch file address for the security is removed from the security dictionary. As indicated previously, a security entry in the dictionary which does not have an associated stock watch file address indicates that no terminal in the system is at that time watching the security. From step 190, the operation proceeds to step 192 during which the security dictionary is written from working memory back into the main memory. From step 192 if the entry was the only one in the system, or from step 188 if the entry was not the only one in the system, the operation proceeds to step 194 during which the stock watch file entry is written back from working store into main memory. From step 194, if the deleted entry was the only one for the stock on the line and from step 184 if at was not the operation proceeds to step 196 during which a cat update message is constructed. Since two entries in the CAT table would normally be changed (the entry being deleted and the proceeding entry with its chain address changed), two CAT update messages would be required. The form of these messages and their construction would be the same as was described previously in conjunction with step 104 (FIG. 6A). When the CAT update message has been constructed, it is transmitted over line 16 to the PCU at which the deletion is to occur (step 198). During the next step in the operation, step 200, a message is constructed at the CC to cause the screen to be blanked at the location of the deleted entry. During step 202 this message is transmitted over line 16 to the PCU. The blanking of the entry in the PCU memory inhibits the refreshing of the entry on screen 24 (FIG. 1) causing a blank to appear in place of the entry. When step 202 has been completed, the operation proceeds to step 204 to determine if there are any more stocks which are to be deleted from the system. If there are additional stocks to be deleted from the system, the operation returns to step 160 for the new stock.

GENERATE INFORMATION UPDATE MESSAGE AT CC

Figure 8:
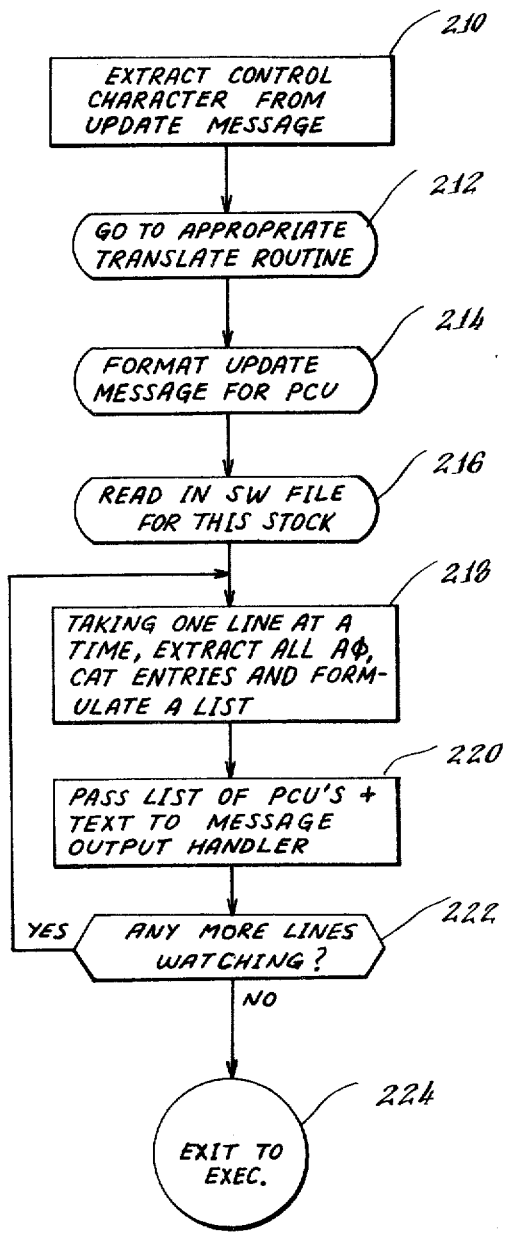
FIG. 8 is a flow diagram of the technique employed at a CC for generating an item update message.

FIG. 8 is a flow diagram of the operations which are performed at the CC when a message is received indicating that there has been some change in the information relating to a particular stock. These operations result in messages being set along the lines 16 to the various PCUs causing entries for the given stock to be updated.

An update message received at the CC from satellite 10 contains, among other things, as indication of the stock, the change which has occurred in the stock, and a control character indicating the type of update message which was received. For example, the message may contain information on a transaction including price and volume, may contain last, bid, ask type information, or may be a message which is received at the beginning of the day which contains the closing price for the stock on the preceding day. During step 210, (FIG. 8) the control character is extracted from the update message and utilized to determine the type of update message which has been received. During step 212, the information extracted from the control character is utilized to call in an appropriate translate routine at the CC permitting the information in the update message to be received and stored in appropriate CC memory locations. During step 214, the information stored during step 212 is utilized to format an update message for the PCUs. During this step only the information portion of the message is formatted with the address portion of the message being formed in a manner to be described shortly. Step 214 is required because the information which is sent to the PCUs may differ in format and content from the information contained in the original update message received at the CC. For example, the information received at the CC may include bid, ask, last and volume while the output message may contain only last price.

Once the information portion of the update message has been formed, the address portion of the message must be formed. The first step in this operation, step 216, is to read the stock watch file information for the stock from section 42 of main memory 15 to working memory 17. During step 218, the next step in the operation, the stock watch file is scanned one line or channel 16 (i.e. one block) at a time (FIG. 4D) and all the AO (PCU) addresses and corresponding CAT addresses in the block are extracted and formulated into a list. When this has been accomplished, the list and the text formatted during step 214 are passed to a message output handler routine which generates an update message on the line 16. This message is in the following form:

SOH Fl A01 X1X2X3 A02 X1X2X3 ...A0N X1X2X3
STX FlF2...FN US α Fl'F2'... FN'... ETX

Where:

SOH is a start of message indicator;

Fl is a function indicator telling the type of message (i.e. stock update, CAT update, etc.);

AX is a PCU address;

X1X2X3 are characters indicating the CAT address of the first entry in the CAT table at the associated PCU for the stock to be updated;

STX is a character indicating the end of the address information and the start of text;

F1F2...FN are the information characters of a first field;

F1'F2'...FN' are the information characters of an additional field;

US is an end of field indicator;

α is a character indicating displacement of the information in the field from the cell starting address (the function of this character will be described in greater detail later);

ETX is the end of message character.

Once step 220 has been completed for a line 16 and the update message transmitted over the line, the CC checks the stock watch file to determine if any more lines 16 are watching the security (step 222). If an additional line is watching the security (i.e. if there is another block in the stock watch file) the operation returns to step 218 to cause the address information to be extracted and an update message to be assembled and transmitted over the new line 16. When, during step 222, it is determined that all lines 16 having PCUs watching the stock to be updated have had update messages transmitted over then, the operation proceeds to step 224 which returns the CC to its normal executive routine to proceed with other functions.

From the above it is seen that information required for updating information relating to a particular stock or other item at all the locations in which it is stored at PCUs serviced by a given line 16 may be accomplished through the transmission of a single update message over the line, which message has only four address characters for each PCU. This number of address characters is the same regardless of the number of entries for the stock at the PCU. In the discussion to follow, the manner in which the information in the message is utilized at the PCU to effect the required updating will be described.

HANDLING OF INFORMATION UPDATE MESSAGE AT A PCU

As indicated in the preceding section, an information update message on a line 16 may contain information for more than one of the PCUs on the line. The first step which the PCU must perform in processing an update message is thus to determine whether the message is directed to it and to store the CAT address information (i.e. the X1X2X3 characters) associated with the PCU in the message if the message is directed to the PCU. FIG. 9 is a flow diagram of the operations performed at a given PCU in accomplishing this function.

Referring now to FIG. 9 it is seen that the first step in this operation is to input a character from line 16 (step 230). During step 232 a determination is made as to whether the received character is a start-of-message (SOH) character. If the received character is not an SOH character, it is discarded and the operation returns to step 230 to input the next character on the line.

When, during step 232, it is determined that the received character is an SOH character, the following character is inputed (step 234) and stored as the function indicator (Fl) character (step 236). The next character received is the AO or PCU address character. This character is inputed during step 238. During step 240 a determination is made as to whether this character is the start of message (STX) character. The first time this step is performed the results of the test will always be "No" causing the operation to proceed to step 242. The reason for step 240 will be apparent later. During step 242, a test is performed to determine if the received AO code is the address for the given PCU. This test is required since, as was indicated previously, each information update message may be directed to a number of PCUs. If, during step 242, it is determined that the received AO address is not for the particular PCU, the operation branches to step 244 during which the next three characters, the CAT address characters associated with the PCU address, are inputted and discarded. From step 244 the operation returns to step 238 to input the next PCU address (AO) character.

If during step 240 it is found that the character being looked at is the start of message (STX) character, this means that the received message is not for the PCU monitoring the line and the operation returns to step 230, monitoring input characters for the beginning of a new message. If, during step 242, it is found that the received AO code is that for the particular PCU, the operation proceeds to step 246 to read in the following three CAT address characters (X1X2X3 characters) and to store these characters in a register which will be referred to as the MIS address table. Once these characters have been stored, the operation proceeds to step 248 to input additional characters and step 250 to look for the start of message character. Steps 248 and 250 are repeated, with the inputted characters being discarded, until the start of message character is located at which time the operation proceeds to step 252. During step 252 the stored function indicator (Fl character) is looked at and utilized to obtain and store a background indirect jump address (BIJA) for the program required to process the particular function. Where a stock watch update is being performed, the BIJA would be the address for the first instruction of a stock watch update routine. During step 254, the BIJA is used to cause a branch to the first step of the stock watch update program.

FIG. 10 illustrates in flow diagram form the steps of a stock watch update program at the given PCU. From this figure it is seen that the first step in this program, step 256, is to determine if the character presently being looked at is the end of field (US) character. Since the STX character is at this time the last character inputed, the first time step 256 is performed a "No" output will always be obtained. When a "No" output is obtained during step 256, the operation branches to step 258 during which a determination is made as to whether the character then being looked at is the STX character. Since the STX character is the last character loaded into the PCU at this time, the first time step 258 is performed a "Yes" output will always be obtained. When a "Yes" output is obtained during step 258, the next step in the operation is step 260. During step 260 the three address characters (X1X2X3) which indicate the beginning address in the CAT table for the chain of entries relating to the stock being updated, which characters are stored in the MIS address table, are stored as a sixteen bit address in an initial CAT pointer register. During step 262, the next step in the operation, an auxiliary buffer address is substituted into the MIS address table. Th auxiliary buffer will, as will be seen shortly, be utilized to assemble a field of update information. During step 264, the next step in the operation, a field number and a displacement constant, both of which are stored in appropriate registers at the PCU, are set equal to zero. The function of these two numbers will be described later. During step 266 the auxiliary buffer in which the received field of information is to be assembled is cleared.

From step 266 the operation returns to step 268 (FIG. 9) to input the next character from the IO. At this state in the operation the character inputted would be the first character following the start of message character, or in other words the first character of the first information field. During step 270, the next step in the operation, a determination is made as to whether the inputted character is the end-of-message character (EXT). At this point in the operation a "No" output is obtained during step 270 causing the operation to proceed to step 254 during which a jump is again performed to step 256, the beginning of the stock watch update program.

With the first character of the first field of information character being inputted, "No" outputs are obtained during both steps 256 and 258, causing the operation to branch from step 258 to step 272. During step 272, the inputted character is processed as a standard input character to the PCU and is stored in the addressed auxiliary buffer. From step 272 the operation returns to step 266 to input the next information character of the first field.

Steps 256, 258, 268, 270 and 272 are repetitively performed until all characters of the first information field have been inputted and stored in the auxiliary buffer and the character inputted during step 268 is the end-of-field (US) character. When this occurs, a "Yes" output is obtained during step 256 causing the operation to branch to step 274 during which the background program is changed from "stock watch update" to "shift field." From step 274 the operation returns to step 268 (FIG. 9) during which the $\alpha$ or displacement character following the end-of-field character is loaded. Since this character is not an ETX, the operation branches to step 254 during which a jump is performed to the shift field program.

FIG. 11 is a flow diagram of the shift field program. Referring to FIG. 11, it is seen that the first step of this operation is to add the value of the inputted $\alpha$ character to the cumulative displacement constant previously stored. Since, during step 264, the displacement constant was set equal to zero, the effect of this operation the first time it is performed is to set the displacement constant equal to the value of the $\alpha$ character. As will be seen shortly, the stored displacement is utilized to control the address in memory at which the information of the inputted field is stored. The displacement constant is required because the address stored in the CAT table is the address of the beginning of a cell. Depending on the format utilized, the field will be stored a number of character positions displaced from the beginning of the cell. The $\alpha$ character indicates this displacement. Where more than one field is stored in a particular format, the second $\alpha$ character merely gives the displacement from the address at which the storage of the first field begins, and this value is added to the previously stored displacement constant to obtain the cumulative displacement constant. The above-described sequence of operations will be presented in greater detail later.

During step 282, the next step in the operation, the background program is changed back to stock which update. The operation thus stays in the shift field program only when the $\alpha$ character is inputted.

During step 284 the CAT pointer is initialized. This step involves transferring the address stored in the initial CAT pointer register (i.e. the received X1X2X3 characters stored during step 260) into a CAT pointer register. During step 286, the next step in the operation, the sixteen bit address stored in the CAT pointer register during step 284 is utilized to read out the entry in the CAT table which is stored at the address indicated in the CAT pointer register. During step 288 a determination is made as to whether the entry read out is a valid entry. It is possible that an entry may have only a CAT linkage information and not a cell address. Such an entry would be retained in order to hold the chain. If, during step 288, it is determined that the entry is not valid, the operation branches to step 290 during which a determination is made as to whether the end of the chain has been reached. This would occur when the bits of the CAT linkage portion of the accessed CAT entry contain the end-of-chain delimitor, for example all zeros.

If the entry read out during step 288 is valid, the operation branches to step 292 during which the cell address of the accessed entry and the cell type in word ten or twenty of the entry (FIG. 3E) are read. During step 294 a determination is made as to whether information of the type contained in the field now stored in the auxiliary buffer is updated for a cell of the type indicated during step 292. For example, if the stored field contains volume information and the display type is a last-price-only stock watch of the type shown in the top section of FIG. 2, then the stored field would not be utilized to update that cell and the operation would branch from step 294 to step 290 to determintion whether the end of the chain in the CAT table has been reached.

If, during step 294, it is determined that an update is to be performed with the field stored in the auxiliary buffer on the cell indicated at the CAT address, the operation proceeds to step 296. During step 296, the cumulative displacement value formulated during step 280 is added to the cell address read out during step 292 to generate the field address at which the update is to occur. The reason for this operation has been described above.

The next step in the operation, step 298, is to determine from the cell type information read out during step 292 whether this is a transaction watch entry. If it is determined that the entry is a transaction watch entry, the operation proceeds to step 300 during which the characters of the line beginning with the field address computed during step 296 are each shifted six characters positions (i.e. one word) to the right. This results in the right-most or oldest word (i.e. the oldest price) being shifted out and a space being left in the left-most (i.e. the addressed) field for the storage of the new price. From step 298 if a transaction watch entry is not being updated, or from step 300 if a transaction watch entry is being updated, the operation proceeds to step 302. During step 302, the field of information stored in the auxiliary buffer is shifted, read, or transferred into the memory field having the address computed during step 296. The updating of a field for one cell at the PCU containing information relating to the particular stock is in this manner effected.

From step 302 the operation proceeds to step 290 to determine if the end of the chain at the PCU for the given stock has been reached. As indicated previously, this is determined by examining the CAT linkage bits of the accessed CAT entry to determine if they contain the end-of-chain delimitor. If the end of chain has not been reached, the operation branches from step 290 to step 304. During step 304, the CAT linkage bits of the entry are utilized to generate a new CAT pointer which is stored in the CAT pointer register. Since, as was indicated previously, the three most significant bits are common for all entries at the CAT table, only the ten least significant bits of the address are stored in the CAT linkage, and these are added to the common three most significant bits to obtain the CAT pointer address.

From step 304 the operation returns to step 286 to read out the CAt entry indicated by the CAT pointer and to utilize this entry to update the field of the memory cell corresponding to the accessed CAT entry which field contains information of the type stored in the auxiliary buffer. At the end of each update operation, step 290 is repeated to determine whether the end of the chain for the stock at the PCU has been reached. When, during step 290, it is determined that the end of the chain for the security has been reached (i.e. the end-of-chain delimitor is detected in the CAT linkage portion of the accessed CAT entry) the opeation branches to step 306 during which the field number is incremented. Since this number was initially set to zero during step 264, the first time this operation is performed the field number will be incremented to one.

Step 306 having been completed, the operation returns to step 266 (FIG. 10) during which the auxiliary buffer is cleared (i.e. the field of information stored therein is erased). The operation then proceeds to step 268 to input a new character from the IO, in this case the first character of the second field of the message. Since this is not an end-of-message character, the operation proceeds to step 254 to jump to the stock watch update program. This program is repetitively operated in the manner previously described to store the characters of the second field in the auxiliary buffer. When the storage has been completed and the end-of-field (US) character is detected during step 256, the operation proceeds to load the displacement character and then to execute the shift field program diagrammed in FIG. 11. The $\alpha$ character added to the cumulative displacement constant during step 280 in this instance would indicate the displacement of the beginning of the new field from the beginning of the previously entered field and would be added to the displacement value previously stored. During step 284 the CAT pointer would again be initialized with the value stored in the initial CAT pointer register. The remaining steps in the process for entering the second field would be identical to those previously described with reference to the entry of the first field and will not be repeated.

When the end of the chain is again reached after the second field has been updated for all entries for the security at the PCU, containing information of the type in this field, the field number is again incremented during step 306 and the operation returns to step 268 to cause a new character to be inputted from the IO. If there are additional fields of new information in the update message, they will be processed in the same manner indicated above for the first two fields. If, however, all fields of the update message have been processed, then the character loaded during step 268 will be the end of message (ETX) charactr. When this occurs, a "Yes" output is obtained during step 270 causing the operation at the PCU to return to the repetitive operations of steps 230 and 232 during which a search is performed for the beginning of a new message.

From the above it is apparent that, utilizing the teachings of this invention, all entries stored at a given PCU concerning a given stock or other item may be updated in response to the receipt of a single update message may contain only a single address for each PCU. By providing a plurality of addresses in the message, the single message may be utilized to update all PCUs on the line which contain information relating to the stock to be updated.

CHANGING OF CAT TABLE ENTRIES AT PCU

As indicated previously in connection with the discussion of FIGS. 6A, 6B, and 7, any change which is made in the stocks being watched at a particular PCU causes one or more messages to be transmitted to make corresponding alterations in the CAT table at the PCU. The form for each of these messages is, as previously indicated,

SOH FI AO X1X2X3 STX F1-FN ETX

Where the significance of each of the above characters is as previously indicated.

Since the flow diagram of FIG. 9 is a generalized input routine for the PCU, it may also be utilized for processing CAT update or any other received message at the PCU. Thus, referring to FIG. 9, the FI characters stored during step 236 will indicate that the received message is a CAT update message or, more probably, that the received message is an update message for a control area. Since this type of message is normally directed only to a single PCU, step 242 will provide a "Yes" output for only one of the PCUs on the line. The three CAT table address characters are stored during step 246 and the next character received is the STX character resulting in a "Yes" output during step 250. During step 252 the BIJA is set for a normal memory update.

In performing the normal memory update it should be noted that, whereas each input character contains six information bits (additional parity and control bits may also be provided), each word in memory 20 is 16 bits long. Therefore, three input characters are required in order to provide the 16 bits for each memory word (two additional bits are not utilized).

Referring now to FIG. 12, it is seen that the first step in the memory update operation, step 310, is a check to determine if the STX character is the last received character. The first time step 310 is performed, the STX character is the last character inputted, resulting in a "Yes" output during this step. The operation thus branches to step 311 during which an index, the function of which will be described shortly, is reset. During step 312, the next step in the operation, the auxiliary buffer is cleared. The operation then returns to step 268 (FIG. 9) to input the next character (the first character of the update information). Since this character is not the ETX character, the operation returns from step 254 to step 310. This time a "No" output is obtained during this step causing the operation to branch to step 313. During this step, the received character is stored in the auxiliary buffer. During step 314 the index is incremented and during step 315 a test is performed to determine if the index is equal to three. The index not being equal to three at this time, the operation returns to step 268 to input the next character.

This sequence of operations is repeated until, during step 315, the index is found equal to three at which time the operation branches to step 316. As indicated previously, three input characters are utilized to form one word in memory 20. The three characters in the auxiliary buffer at this time are thus, during step 316, stored in memory 20 at the address indicated in the MIS address table. A word having been stored in the memory, the address in the MIS address table is incremented (step 318). The index is then reset (step 311), the auxiliary buffer cleared (step 312) and a new input character received (step 268). This sequence of operations is repeated with each three received characters being stored as a successive word in memory 20 until, during step 270, an ETX character is detected. When this occurs, the memory update operation is completed and the operation returns to step 230 to begin the search for a new input message.

Where an entry is to be deleted from the CAT table, two alternative procedures are possible. With one of these procedures, all zeros are written into the entry to be deleted, effectively erasing it, and a second message is provided causing the preceding entry in the chaim to be rewritten with the CAT linkage contained in the deleted entry being written as the CAT linkage in the CAT entry preceding the deleted entry. This procedure has the disadvantage of requiring two messages from the CC. The alternative procedure involves either overwriting zeros or some other code in the cell address portion of the entry to be deleted which code is recognized by the system as a dummy code and leaving the linkage intact. Step 288 (FIG. 11) is provided to check for such a dummy entry and to skip over it, using only its CAT linkage, where such an entry is located. This procedure has the disadvantage of requiring extra steps in the stock watch update operation. A more serious problem may arise where a new entry for another stock is written in the CAT word causing the stored linkage to be erased and breaking the chain.

It is noted that a CAT addition or deletion normally requires two messages. An alternative procedure is to combine the information into a single message. Since each entry in the CAT table contains only 16 bits, whereas three six bit characters coming in on the line contain 18 bits, there are two extra bits in the received characters which may be utilized for control purposes. To get the two messages into a single message, the portion of the message after the STX character contains nine rather than three characters. One or more of the two extra bits in the third character is marked to indicate that the following three characters are address characters of another CAT entry. The PCU, recognizing this, stores these characters and utilized them to address a CAT entry which has the contents of the last three characters of the message overwritten therein.

PCU CIRCUITRY ADAPTED FOR PERFORMING THE FUNCTIONS OF FIGS. 9–12

Referring now to FIGS. 13A and 13B, exemplary circuitry for a portion of a PCU 18 adapted for performing the functions of FIGS. 9–12 is shown. With respect to these figures, it is assumed that there is a bit clock and a character clock associated with line 16 and that these clock signals are available at the PCU. The bit clock appears on a line 320 and the character clock on a line 322. It is also assumed that all flip-flops in the circuit are initially in their reset of ZERO state.

Bits on line 16 are gated through gate 324 (FIG. 13A) into one-character input shift register 326 under control of a bit clock on line 320. When a full character is stored in register 326, a character clock appears on line 322 enabling SOH detect circuit 328. The information inputs to detect circuit 328 are the output lines 330 from input register 326. If the code in register 326 at a character time is not the SOH code, there is no output from circuit 328 and the system proceeds to apply a new character through gate 324 to input register 326. When, during a character clock time, an SOH character is detected in register 326, detect circuit 328 generates an output on line 332 which is applied to set flip-flop 334 to its ONE state. Referring for a moment to FIG. 9, it is noted that the sequence of operations described above is equivalent to steps 230 and 232.

With flip-flop 334 in its ONE state, a signal appears on line 336 which signal is applied as a conditioning input to AND gate 338. At the next character clock time, the FI character is stored in input register 326. At the same time, a signal appears on line 322 conditioning AND gate 338 to generate an output on line 340 which output is applied (1) to the ZERO-side input of flip-flop 334 to reset this flip-flop, (2) through OR gate 342 to the ONE-side input of flip-flop 344 to set this flip-flop to its ONE state, and (3) as a conditioning input to gate 346 to permit the FI character stored in input register 326 to be transferred into FI register 348.

Steps 234 and 236 of FIG. 9 are in this manner performed.

At the next character clock time, the character stored in input register 326 is the A0 or PCU address character. Flip-flop 344 being in its ONE state at this time results in a signal appearing on line 350 which line is connected as the conditioning input to compare circuit 352. Another conditioning input to compare circuit 352 is CC line 322. Compare circuit 352 is thus fully conditioned at this time to compare the A0 address in input register 326 with the A0 code for the given PCU 18 stored in register 354. At the same time, the CC signal on line 322 enables STX detect circuit 356, the information input to which is also line 330. If there is no output from STX circuit 356 on line 358, indicating that the character in register 326 is not the STX character, inverter 360 generates an output which is applied as one input to AND gate 362. The other input to AND gate 362 is "No" output line 364 from compare circuit 352. Thus, if there is an A0 code in register 326 which is not the A0 code for the PCU 18, AND gate 362 is fully conditioned to generate an output on line 366 which is applied through OR gate 368 and line 370 to (1) set flip-flop 372 to its ONE state and (2) to pass through OR gate 374 to reset flip-flop 344 to its ZERO state.

With flip-flop 372 in its ONE state a signal appears on line 376, conditioning AND gate 378 at each character clock time to generate an output on line 380 which output is applied to increment counter 382. When the three XI characters following the wrong A0 character have passed through input register 326, counter 382 has been stepped to a count of three, resulting in a signal appearing on counter output line 384. The signal on line 384 is applied to reset flip-flop 372 to its ZERO state and as one input to AND gate 386. Since flip-flop 388 is in its ZERO state at this time, a signal appears on line 390 fully conditioning AND gate 386 to generate an output on line 392 which is applied through OR gate 342 to again set flip-flop 344 to its ONE state.

At the next character clock time either another A0 code or the STX character is resident in input register 326. If the STX code is in input register 326 at this time, it means that the received message is not for the PCU 18. Under these conditions detector 356 generates an output on line 358 which is applied as one input to AND gate 394, the other input to this AND gate being ONE-side output line 350 from flip-flop 344. AND gate 394 being fully conditioned at this time generates an output on line 396 which is applied through OR gate 374 to reset flip-flop 344 to its ZERO state and is applied as a reset input to FI register 348. The circuit is thus restored to its initial condition and resumes the search for another SOH character.

If, on the other hand, the A0 code resident in register 326 is that for the particular PCU 18, there will be a successful comparison in circuit 352 at this time resulting in a signal on line 398 which is applied to set flip-flop 388 to its ONE state and is also applied through OR gate 368 to set flip-flop 372 to its ONE state and to reset flip-flop 344 to its ZERO state. Referring again to FIG. 9, it is seen that the sequence of operations described above effectively performs steps 238, 240, 242, and 244.

Referring still to FIG. 9, it is seen that the next step in the operation, step 246, involves the storing of the next three characters in a register which, for purposes of FIG. 13A, will be called the initial CAT pointer counter 400. In accomplishing this step, it is remembered that AND gate 378 generates an output on line 380 at each character clock time when flip-flop 372 is in its ONE state. In addition to incrementing counter 382, the signal on line 380 is also applied as one of the inputs to AND gate 402. The other input to AND gate 402 is ONE-side output line 404 from flip-flop 388. AND gate 402 is thus fully conditioned at each character clock time to generate an output on line 406 which output conditions gate 408 to pass the contents of register 326 on lines 330 to initial CAT pointer counter 400. When the third character has been transferred into counter 400, counter 382 generates a signal on line 384 which is applied to reset flip-flop 372 inhibiting the storing of additional characters in counter 400. Since flip-flop 388 is now in its ONE state, AND gate 386 is not conditioned at this time and flip-flop 344 remains in its ZERO state. Thus, at this time, only flip-flop 388 is in its ONE state.

Additional characters received at register 326 are discarded until detector 356 indicates that the STX character is in the input register. When this occurs, the resulting signal on line 358 is applied as one input to AND gate 410, the other input to this AND gate being output line 404 from the ONE side of flip-flop 388. AND gate 410 is thus fully conditioned at this time to generate an output on line 412 which is applied (1) to reset flip-flop 388 to its ZERO state, (2) through OR gate 414 to reset auxiliary buffer 416, (3) through OR gate 418 to set flip-flop 420 to its ONE state, (4) to reset field number register 422, and (5) to reset displacement constant address register 424. Referring to FIGS. 9 and 10, it is seen that steps 248, 250, 264 and 266 have effectively been performed. Step 260 has been eliminated by storing the characters in the initial CAT pointer register directly from the input register without going through the MIS address table. Steps 252, 254 and 262 being basically programming steps, also need not be performed with the special purpose circuitry of FIGS. 13A and 13B.

With flip-flop 420 in its ONE state, a signal appears on ONE-side output line 426 from this flip-flop which signal is applied as one input to AND gate 428. At each character clock time, AND gate 428 is fully conditioned to generate an output on line 430 which is applied to condition gate 432 to pass the character in register 326 into auxiliary buffer 416. This sequence of operation is repeated during each succeeding character time until, during a given character time, the end-of-field (US) character is detected in input register 326 by detector 434 (FIG. 13B). It is noted that the US character is also stored in buffer 416. If the storage of this character presents a problem, its storage may be inhibited or it may be erased or masked in a standard manner.

When the US character is detected, detecter 434 generates an output line 436 which is applied as one input to AND gate 438. A second input to AND gate 438 is ONE-side output line 426 from flip-flop 420. The final input to AND gate 438 is SW update output line 440 from function decoder 442. The information inputs to decoder 442 are output lines 444 from function indicator register 348. AND gate 438 is thus fully conditioned if the circuit is processing a stock watch update message and has detected the end-of-field character. Steps 256, 268, and 272 of FIGS. 9 and 10 are in this manner performed.

Output line 446 from AND gate 438 is connected to set flip-flop 450 to its ONE state and is also connected through OR gate 452 and line 453 to reset flip-flop 420 to its ZERO state. Output line 454 from the ONE-side of flip-flop 450 is connected as one input to AND gate 456. At the next character time, when the alpha or displacement character is in input register 236, AND gate 456 is fully conditioned to generate an output on line 458 which is applied (1) to reset flip-flop 450 to its ZERO state, (2) to condition gate 460 to pass the initial CAT pointer in register 400 through the gate and through OR gate 462 to be stored in CAT pointer register 464, (3) to condition gate 466 to pass the alpha character in register 326 to be added to the displacement stored in displacement constant adder 424, and (4) through OR gate 468 to start the running of shift field clock 470. Clock 470 is a free running circuit which, once started, generates six successive output clocks, designated C1–C6, on lines 471-476 respectively, and then terminates unless restarted. The rate at which clock pulses are generated by clock 470 is many times greater than the rate at which the character clocks are generated on line 322. Referring now to FIG. 11, it is seen that steps 280 and 284 have been accomplished by the operations indicated above. Because the circuit of FIGS. 13A and 13B is hard wired, steps 274 and 282 are not required.

The signal on C1 line 471 from clock 470 is applied to condition gate 480 to pass the address in CAT pointer register 464 to memory read out circuit 482. This results in the entry at the address indicated in register 464 being read out from CAT area 32 of memory 20 through lines 484 and conditioned gate 485 to be stored in CAT register 486. Step 286 of FIG. 11 is in this manner effected.

The address read out of register 464 is also applied to cell status word address compute circuit 487. Referring to FIGS. 3D and 3E, it is seen that if the CAT word address is one of the first nine of a line, the cell type is in word ten, while if the CAT word is between word eleven and nineteen, the cell type is in word twenty. Circuit 487 uses the above to compute the address of the cell type word from the received cell address. At C2 time, a signal appears on line 472, conditioning gate 489 to pass the computed cell type address to circuit 482. This results in the cell type word being read out from the CAT area 32 of memory 20 through lines 484 and conditioned gate 491 to be stored in cell type register 488. This results in the effective performance of step 292.

During C2 time, dummy code detect circuit 490 is also enabled to test if a dummy code is stored in the cell address portion of the CAT entry stored in register 486. If the dummy code is detected, a signal appears on line 494 which is applied through OR gate 496 to clock 470 causing the count in the clock to be forced to C6. As will be more apparent shortly, the forcing of the count in counter 470 to C6 causes an effective bypass of the steps performed under control of clocks C3, C4 and C5 and effectively results in the end-of-chain determination being performed as the next step. Step 288 of FIG. 11 is thus performed.

The C3 clock on line 473 is applied as the conditioning input to field update logic 498. Information inputs to circuit 498 are output lines 500 from field number register 422 and output lines 502 from cell type register 488. The function of circuit 498 is to determine whether a cell of the type indicated in register 488 contains information of the type presented in the field number indicated in register 422 or, in other words, whether the cell has a field which has to be updated with the information presently in auxiliary buffer 416. If circuit 498 determines that the cell is not to be updated, it generates an output on line 504. One possible circuit for performing the function of circuit 498 would include circuits for converting each possible code in register 422 into a signal on a single line (i.e. if the number one was stored in register 422 there would be an output on a first line, if the number two was stored in the register there would be an output on the second line, etc.) and for converting each possible code in register 488 into a signal on a single line. These lines would then be selectively connected as inputs to AND gates, there being an AND gate provided for each possible combination for which a field would not be updated. The outputs from the AND gates would then be ORed together to generate the desired output on line 504. The signal on line 504 is applied through OR gate 496 to force clock 470 to a count of six. As indicated previously, this causes the field update step to be bypassed and an end-of-chain determination to be made. Step 294 (FIG. 11) is in this manner effected.

The C3 clock on line 273 is also applied to enable adder 510 (FIG. 13A), the two inputs to which are output lines 512 from displacement constant adder 424 and output lines 514 from the cell address portion of CAT register 486. The resulting field address on output line 516 is stored in field address register 518. Step 296 of FIG. 11 is in this manner effected.

The C4 clock on line 474 is connected as a conditioning input to transaction watch detect circuit 520, the information input to this circuit being output lines 502 from cell type register 488. If it is determined that the cell being updated is a transaction watch cell, detecter 520 generates an output on line 522 which conditions shift field control circuits 524. The information inputs to shift field control circuit 524 are output lines 526 from field address register 518. Shift field control circuit 524 generates outputs on lines 528 to memory read out circuit 482 which cause succeeding fields in display portion 34 of memory 20, starting with the field indicated in field address register 518, to be read out through lines 530 and pass through conditioned gate 532 and OR gate 534 to be restored in memory 20 in a position one field to the right from the position from which the field was read out. This sequence of operations is repeated five times with the fifth field read out not being written back in. Steps 298 and 300 of FIG. 11 are in this manner performed.

The C5 clock on line 475 is applied to condition gate 536 to pass the field address in register 518 through line 537 to memory read out circuit 482. This field is thus read out from the display portion 34 of memory 20. However, since gate 532 is not conditioned at this time, this field is not written back in. Instead, gate 538 is conditioned at this time by the C5 clock applied through OR gate 539 to pass the contents of auxiliary buffer 416 on line 541 through OR gate 534 will be stored in memory 20 at the indicated field position. The updating of a single field in memory 20 (step 302 of FIG. 11) is thus effected.

The C6 clock on line 476 is applied to enable end-of-chain (EOC) detector 540, the information inputs to which are output lines 542 from the CAT linkage portion of the entry stored in register 486. Detecter 540 generates an output on line 544 if the end-of-chain delimitor is stored in register 486. Line 544 is connected as an input to inverter 546 the output from which is connected as one input to AND gate 548. The other input to AND gate 548 is C6 clock line 476. Thus, if at C6 time the end-of-chain delimitor is not detected in register 486, AND gate 548 is fully conditioned to generate an output on line 550 which is applied through OR gate 468 to restart clock 470 and is applied to condition gate 552 to pass the CAT linkage address is register 486 through OR gate 462 to be stored in CAT pointer register 464. Steps 290 and 304 of FIG. 11 are thus performed and the circuit is ready to utilize the information stored in its auxiliary buffer 416 to update the next entry in the chain.

When, during a C6 time, an end-of-chain delimitor is detected, the resulting signal on line 544 is connected as a step input to field number register 422 (thus performing step 306 of FIG. 11) through OR gate 418 to set flip-flop 420 to its ONE state and through OR gate 414 to reset the contents of auxiliary buffer 416. The circuit is thus restored to a condition in preparation for the receipt of the next field of information characters. ONE-side output line 426 from flip-flop 420 is also connected as one input to AND gate 566. The other input to AND gate 566 is output line 568 from ETX (end-of-text) detecter 570. Thus, if the ETX character is detected when the circuit is in a condition to load field characters, (i.e. a "Yes" output is obtained during step 270 FIG. 9) AND gate 566 generates an output on line 572 which output is applied through OR gate 452 to reset flip-flop 420 to its ZERO state. The circuit is thus restored to its initial condition and is ready to search for the start of a new message.

For memory update, the circuit of FIGS. 13A and 13B functions in the manner previously described to load FI register 348, to load initial CAT pointer register 400, to reset auxiliary buffer 416, and to set flip-flop 420 to its ONE state. When a memory update is being performed, function decoder 442 generates an output on memory update output line 582 which signal is applied as one input to AND gate 584. The second input to AND gate 584 is the signal on line 412 which is applied to set flip-flop 420 to its ONE state. Thus, when a memory update is being performed, at the same time AND gate 420 is being set to its ONE state, AND gate 584 is fully conditioned to generate an output on line 586 which is passed through OR gate 588 to reset the contents of index counter 590. Counter 590 contains the index referred to in step 311 of FIG. 12. Steps 310, 311 and 312 of FIG. 12 are in this manner performed.

With flip-flop 420 in its ONE state, AND gate 428 is fully conditioned at each character time to generate an output on line 430 which conditions gate 432 to pass the character in input register 326 to be stored in auxiliary buffer 416. The signal on line 430 is also applied as one input to AND gate 592, the other input to this AND gate being memory update line 582. AND gate 592 is thus conditioned at each character time to generate an output on line 594 which is applied to increment the index count in counter 500. Steps 313 and 314 of FIG. 12 are in this manner performed.

The above-described sequence of operations continues until the third character has been loaded into auxiliary buffer 416 at which time index counter 590, having a count of three stored therein, generates an output on line 596 which, in conjunction with the signal on memory update line 582, fully conditions AND gate 598 to generate an output on line 600. The signal on line 600 is applied to condition gate 602 to pass the address in initial CAT pointer counter 400 to memory read-out circuit 482, causing the word at the indicated address to be read out from the display portion of memory 20. However, since gate 532 is not conditioned at this time, this word is not written back into memory. Instead, the signal on line 600 is applied through OR gate 539 to condition gate 538 to pass the characters in auxiliary buffer 416 to be stored in the accessed word position. Step 316 of FIG. 12 is in this manner performed. The signal on line 600 is also applied through delay 603, the duration of which is sufficient to permit step 316 to be completed, and line 604 to (1) pass through OR gate 588 to reset index counter 590, (2) step the address in initial CAT pointer counter 400, and (3) pass through OR gate 414 to reset auxiliary buffer 416. Steps 311, 312 and 318 are in this manner effected.

The above described sequence of operations is repeated, with succeeding words being stored in memory 20, until the ETX character is detected in input register 326. When this occurs, ETX detect circuit 570 generates an output on line 568 which fully conditions AND gate 566. As indicated previously, this causes flip-flop 420 to be reset to its ZERO state restoring the circuit to its initial condition in preparation for the receipt of a new message.

In the discussion above a method of updating information in a memory has been described and certain apparatus for effecting the method presented. It is apparent that many existing general purpose processing units could be programmed to perform the various functions indicated at the CC and the PCU. Examples of processors suitable for use as the CC are the Supernova or the Model 800 manufactured by Data General Corporation. Where, for economic or other reasons, it is desirable to do so, special purpose logic such as that shown in FIGS. 13A and 13B, and other apparatus could also be designed to perform these functions.

Further, the organization of information into cells in portion 34 of memory 20, the type of information in these cells, and the cell size may be varied with application. There should, however, be an entry in the CAT for each cell location. It is also apparent that, while in the discussion above only transaction watch has involved manipulation of data in addition to the storage of data, other functions requiring manipulation of the data could also be performed. Thus, referring to FIG. 11, additional steps might be introduced between steps 300 and 302 to test for and perform other functions required as a result of a particular type of information stored in a memory segment. For example, with an extended transaction watch which included price and volume or price, volume and time, a shift of two or three fields might be required instead of a shift of only a single field as shown.

Thus, while the invention has been particularly shown and described above with reference to a preferred embodiment thereof, it will be apparent to those skilled in the art that the foregoing and other changes

What is claimed is:

1. In a system having a programmable control unit for receiving, storing and updating rapidly changing information concerning a large plurality of different data items, said unit including a memory for storing information relating to a plurality of different items, information for a given item being stored at one or more memory locations therein, apparatus for effecting the updating of information relating to a given item at all locations in the memory at which information relating to a given item is stored with a single update message to the unit comprising:

address table storing means having a plurality of storage locations for storing a table comprised of a plurality of entries, each stored in a different storage location, each of said entries containing a cell address identifying a different item storing memory location and a chain address identifying another storage location storing a table entry;

table entry accessing means responsive to an update message relating to the given item for accessing a first table entry from one of said storage locations;

updating means responsive to the cell address in an accessed table entry and to said update message for updating the information for the item at the identified memory location;

said table entry accessing means including means responsive to the chain address in a previously accessed table entry for accessing the next table entry from the storage location identified by the chain address;

said updating means and said table entry accessing means being repetitively operative until all memory locations containing information relating to the given item have been updated.

2. Apparatus as claimed in claim 1 wherein said table storing means is a section of said memory.

3. Apparatus as claimed in claim 1 wherein different locations in said memory may store different types of information relating to an item;

and wherein said table storing means includes means associated with the entry for storing an indication of the type of information stored for the item at the corresponding item storing memory location.

4. Apparatus as claimed in claim 3, wherein said memory is organized so that the memory locations are grouped into segments with all locations in a given segment storing information of the same type;

and wherein the means for storing an indication of information type in said table provides for storage of a single entry for each group of table entries corresponding to the locations of a single segment.

5. Apparatus as claimed in claim 3 wherein an update message may contain information of different types relating to the given item;

and wherein said updating means is responsive to the information type indication stored with an entry in said table for controlling how the information from the update message is utilized by said updating means to update the information stored at the memory location address indicated by the table entry.

6. Apparatus as claimed in claim 5 wherein said information of different types in the update message are contained in separate fields; and including means operative in response to the first field of an update message for causing said first entry accessing means, said updating means and said table entry accessing means to be operative to utilize the information in said first field to selectively update, under control of the information type indications, memory locations containing information relating to the given item;

means operative when updating with information from said first field is completed for determining if there are any additional fields in the message; and means responsive to a determination that the updating has not been completed for all of the fields of said update message for causing the operations performed with said first field to be repeated for the next field until all of the fields have been completed.

7. Apparatus as claimed in claim 6 wherein each memory location may contain a plurality of fields of information;

wherein there is associated with each field of the update message a displacement constant; and including means for utilizing each displacement constant to control the field at a memory location which is updated by the associated update message field.

8. Apparatus as claimed in claim 7 including:

means for storing a cumulative displacement constant;

means operative each time a new field of the update message is detected for adding the displacement constant associated with the field to the stored cumulative displacement constant and for storing the resultant sum in said cumulative displacement constant storing means; and means for adding the stored cumulative displacement constant to the memory location address from each accessed table entry to obtain the memory address of the field to be updated by the update message field.

9. Apparatus as claimed in claim 1 wherein there are a plurality of said units all of which are connected to have their memories updated by a single update message on a single line;

wherein said update message includes, in addition to update information, an indication of units which are to receive the update information and the address of the first entry in said table for the given item for each of said units;

said table entry accessing means including means for detecting the address of the unit in the update message, and means responsive to said detection means for storing the corresponding first table entry address.

10. Apparatus as claimed in claim 9 wherein said system includes a control computer for generating update messages on said line.

11. Apparatus as claimed in claim 10 wherein said control computer generates update messages on a plurality of lines, the control computer generating a single update message on each line having at least one unit connected thereto with a memory in the unit containing information on a given item when information on the given item is to be updated.

12. Apparatus as claimed in claim 10 including a memory at said control computer, said memory containing an image of the table stored at each of said units.

13. Apparatus as claimed in claim 12 wherein the item which information at a given memory location relates to may be altered; and including
means operative when the item for a given memory location is altered for updating the corresponding entry in said table;
said means including means at said control computer for generating a table update message;
and wherein the table image in the control computer memory is utilized for the generating of said table entry update message.

14. Apparatus as claimed in claim 10 including a memory at said control computer, said memory containing a dictionary for storing all items to be stored in the system.

15. Apparatus as claimed in claim 14 wherein the control computer memory contains a file for storing an entry for each item, said entry containing, for each unit in the system storing information concerning the item, the address of the first table entry at the unit for the item; and
wherein said dictionary stores the control computer memory address of the file entry for each item.

16. Apparatus as claimed in claim 3 including means operative in response to an indication that certain types of information are being updated, for performing selected editing functions on the information stored at the memory location being updated.

17. Apparatus as claimed in claim 16 wherein said means for performing editing functions includes means for shifting the data stored at the memory location to make room for the update information.

18. Apparatus as claimed in claim 1 wherein the item which information at a given memory location relates to may be altered; and including
means operative in response to the item for a given memory location being altered for updating the corresponding entry in said table.

19. Apparatus as claimed in claim 18 wherein said table update means includes means operative when a new item is stored at a memory location for making a corresponding table entry and including means for tieing the new table entry into the chain of entries for the given item.

20. Apparatus as claimed in claim 18, including table entry deleting means operative in response to an item being deleted at a given memory location for deleting the corresponding table entry, and chain closing means responsive to the deletion for closing the chain in the table for the deleted item.

21. Apparatus as claimed in claim 20 wherein said table entry deleting means and said chain closing means operate to delete only the memory location address portion of the table entry, leaving the chain for the item in tact; and including
means operative when a table entry having a deleted memory location address is accessed for bypassing the memory update and utilizing the chain address in the entry to access the next table entry for the item.

22. Apparatus as claimed in claim 1 wherein said items are stock information items and wherein an update message is generated when a transaction occurs on a stock which causes a change in a stock information item.

23. In a system in which a control computer supplies rapidly changing information concerning a large plurality of data items to a plurality of remote utilization units, the improvement comprising:
a programmable control unit located in the vicinity of said remote utilization units and coupled between said control computer and said remote utilization units for controlling the supplying of data items information thereto, and
storage means in said programmable control unit for storing data item information in a manner such that information concerning a data item is stored at a plurality of different data item addresses of said storage means,
said storage means including means providing a common address table storing a plurality of entries identifying data item addresses at which data item information is stored and wherein said providing means includes means for additionally storing chain addresses along with said entries in a manner so that entries corresponding to the same data item are accessible in chain fashion,
said programmable control unit including accessing means responsive to the receipt of a single update message from said control computer for accessing the chain of entries in said table corresponding to a data item indicated by said message,
said programmable control unit also including updating means responsive to an update message for updating the data item information located at the data item addresses identified by the accessed entries in accordance with updating information contained in the update message.

24. The invention in accordance with claim 23, wherein said update message indicates a data item which is to be updated by including in the message the first entry address in the common address table of the chain of entries corresponding to the data item which is to be updated, and wherein said accessing means includes means responsive to said first entry address in said message for accessing the chain of entries corresponding to the thus identified data item.

25. The invention in accordance with claim 23, wherein said update message includes a plurality of field indications identifying a plurality of different updating operations to be performed on an indicated data item, wherein said accessing means includes means operable in response to each of said field indications in said message to access the chain of entries in said table indicated by said message, and wherein said updating means operates during each said accessing of a chain of entries in response to a field indication to perform the particular updating indicated by that field indication on the data item information located at the data item addresses identified by the accessed chain of entries.

26. The invention in accordance with claim 23, wherein the data item information stored at a data item address of said storage means may include a plurality of different types of information relating to a data item, and wherein said providing means includes means for additionally storing control indications along with said entries indicating the types of information relating to a data item stored at the data item addresses identified thereby, and wherein said updating means includes means responsive to said control indications for controlling the updating operations performed at the data item addresses identified by the accessed chain of table entries.

27. The invention in accordance with claim 23, wherein said remote utilization units utilize data information supplied thereto from said programmable control unit in the form of one or more predetermined segments, wherein like information relating to a data item may be contained in one or more segments of the same or different remote utilization units, and wherein said providing means includes means for additionally storing data item information in said storage means of said programmable control unit in storage segments corresponding to said predetermined segments.

28. The invention in accordance with claim 27, wherein said remote utilization units each include a display means for displaying the information contained in one or more of said segments.

29. The invention in accordance with claim 23, wherein the data item information stored at a data item address of each storage means of each programmable control unit may include a plurality of different types of information relating to a data item, and wherein said providing means includes means for additionally storing control indications along with said entries indicating the types of information relating to a data item stored at the data item addresses identified thereby, and wherein said updating means in each programmable control unit includes means responsive to said control indications for controlling the updating operations performed at the data item addresses identified by the accessed chain of table entries.

30. The invention in accordance with claim 29, wherein said update message provides for identification of a data item which is to be updated in accordance therewith by including in the message the respective first entry address in the common address table of each programmable control unit to which the message is directed of the chain of entries corresponding to the data item which is to be updated, and wherein said accessing means in each programmable control unit includes means responsive to its respective first entry address contained in said message for accessing the chain of entries corresponding to the thus identified data item.

31. In a system in which a control computer supplies rapidly changing information concerning a large plurality of data items to a plurality of remote utilization units by sending like update messages thereto, the improvement comprising:

a plurality of programmable control units each located in the vicinity of a respective plurality of said remote utilization units and each coupled between said control computer and its respective plurality of remote utilization units for controlling the supplying of data item information thereto, and storage means in each programmable control unit for storing data item information in a manner such that information concerning a data item is stored at a plurality of different data item addresses of each storage means, each storage means including means providing a common address table storing a plurality of entries identifying data item addresses at which data item information is stored therein and wherein said providing means includes means for additionally storing chain addresses along with said entries in a manner so that entries corresponding to the same data item are accessible in chained fashion, each programmable control unit including accessing means responsive to the receipt of a single applicable update message sent to all of said programmable control units by said control computer for accessing the chain of entries in said table corresponding to a data item indicated by said message, each programmable control unit also including updating means responsive to an update message for updating the data information located at the data item addresses identified by the accessed entries in accordance with updating information contained in the update message.

32. The invention in accordance with claim 31, wherein said update message sent to all of said programmable control units by said control computer includes information indicating the particular programmable control units to which it is directed, and wherein each programmable control unit includes means for determining whether an update message is directed thereto and means responsive to said determining means for causing operation of its respective accessing and updating means in response to the update message.

* * * * *